US010534298B2

United States Patent
Takahashi et al.

(10) Patent No.: US 10,534,298 B2
(45) Date of Patent: Jan. 14, 2020

(54) DISPLACEMENT SENSOR AND IMAGE FORMING DEVICE HAVING THE SAME

(71) Applicant: Konica Minolta, Inc., Chiyoda-ku, Tokyo (JP)

(72) Inventors: Masahiko Takahashi, Toyokawa (JP); Makoto Ooki, Toyohashi (JP); Wataru Senoo, Okazaki (JP); Atsushi Nagaoka, Okazaki (JP); Hidenari Tachibe, Toyokawa (JP); Hajime Taniguchi, Toyokawa (JP); Takafumi Yuasa, Toyokawa (JP); Yoshitaka Otani, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 83 days.

(21) Appl. No.: 15/641,531

(22) Filed: Jul. 5, 2017

(65) Prior Publication Data

US 2018/0017917 A1 Jan. 18, 2018

(30) Foreign Application Priority Data

Jul. 15, 2016 (JP) .................................. 2016-140789

(51) Int. Cl.
*H04N 1/00* (2006.01)
*G03G 15/00* (2006.01)
*G01D 5/34* (2006.01)

(52) U.S. Cl.
CPC ....... *G03G 15/5029* (2013.01); *H04N 1/0075* (2013.01); *H04N 1/00721* (2013.01);
(Continued)

(58) Field of Classification Search
None
See application file for complete search history.

(56) References Cited

U.S. PATENT DOCUMENTS

| 7,535,580 | B2 * | 5/2009 | Matsuoka | ................ | G01P 3/36 |
| | | | | | 356/28.5 |
| 8,587,774 | B2 * | 11/2013 | Funato | ..................... | G01P 3/68 |
| | | | | | 356/28 |
| 9,228,825 | B2 * | 1/2016 | Takaura | ............... | G01B 11/043 |

FOREIGN PATENT DOCUMENTS

| JP | 2011-123085 A | | 6/2011 |
| JP | 2011123085 | * | 6/2011 |

(Continued)

OTHER PUBLICATIONS

Machine translation of Japanese Pat. Appl. 2011-123085 to Masuda et al., published on Jun. 3, 2011.*

(Continued)

*Primary Examiner* — Paul F Payer
(74) *Attorney, Agent, or Firm* — Buchanan Ingersoll & Rooney PC

(57) ABSTRACT

In a displacement sensor, an illumination optical system, which converts laser light emitted from an emission unit into first converging light, and irradiates with the first converging light a detection space through which a target moves. An imaging optical system converts laser light reflected from the target into second converging light, and irradiates with the second converging light a light-receiving surface of a detection unit. The image of the emission unit into which the illumination optical system focuses the first converging light is displaced along the optical axis of the imaging optical system by a temperature change of the illumination optical system. The range in which the image is displaced is limited to be located either anterior to the front principal point of the imaging optical system, or posterior to the rear principal point of the imaging optical system.

8 Claims, 12 Drawing Sheets

(52) U.S. Cl.
CPC .......... *H04N 1/00734* (2013.01); *G01D 5/34* (2013.01); *H04N 2201/0094* (2013.01)

(56) References Cited

FOREIGN PATENT DOCUMENTS

| | | |
|---|---|---|
| JP | 2013-257473 A | 12/2013 |
| JP | 2014-178637 A | 9/2014 |
| JP | 2015-001557 A | 1/2015 |
| JP | 2015-038457 A | 2/2015 |
| JP | 2015-068809 A | 4/2015 |

OTHER PUBLICATIONS

N. Takai et al., "Statistical Properties of Dynamic Laser Speckle and Its Applications to Velocity Measurement", Review of Laser Engineering, Laser Society of Japan, 1980, p. 37-45, vol. 8, No. 2.

T. Asakura et al., Laser Speckle Kenkyu no Tenkai (in Japanese), Research for Electronic Science, Research Institute for Electronic Science Hokkaido University, Feb. 1997, p. 3-12, vol. 4, http://hdl.handle.net/2115/24368.

Kogaku Sekkei no Kiso Chishiki (in Japanese), Nejiro Genossen Inc., Nov. 1, 2013, http://cgi3.genossen.co.jp/wordpress/wp-content/uploads/2013/11/94c979a4b6899c625f3d8cb0def5ca7c.pdf.

* cited by examiner

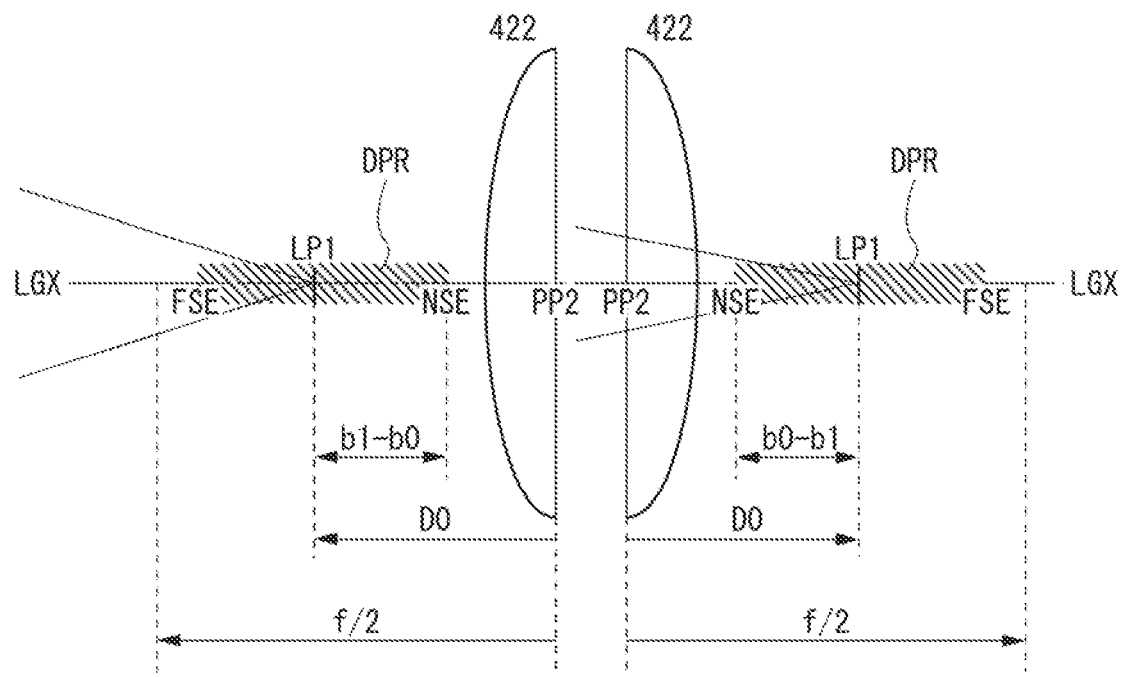

DISPLACEMENT SENSOR AND IMAGE FORMING DEVICE HAVING THE SAME

This application is based on an application No. 2016-140789 filed in Japan, the contents of which are hereby incorporated by reference.

BACKGROUND OF THE INVENTION

1. Field of the Invention

The invention relates to control of driving a movable member and control of conveying an object, and in particular, a technology of determining a displacement of the movable member and object.

2. Background

An increase in operation speed with high print quality maintained is sought for image forming devices such as printers and copiers. To respond to such a request, the devices need more highly accurate control of driving movable members and conveying sheets; the movable members include, in addition to conveyance rollers, a rotatable image carrier such as a photoreceptor drum and an intermediate transfer belt. For example, a preferable idea for an increase in accuracy of the control is to more precisely and rapidly determine a shift or velocity (hereinafter, referred to collectively as "displacement") of a target, e.g. one of the movable members and sheets.

Use of speckle patterns is attracting attention as a promising means for determining displacement with a higher degree of precision. "Speckle" means interference of coherent light diffusely reflected by irregularities in sizes not lower than the wavelength of the coherent light. See, for example, the following references: 1) "Statistical Properties of Dynamic Laser Speckle and Its Applications to Velocity Measurement," Nobukatsu TAKAI and Toshimitsu ASAKURA, Review of Laser Engineering, Vol. 8, No. 2, (Laser Society of Japan, 1980) p. 37-45; 2) "Laser Speckle Kenkyu no Tenkai (in Japanese)" Tioshimitsu ASAKURA and Jun UOZUMI, Research for Electronic Science, Vol. 4 (Research Institute for Electronic Science Hokkaido University, February 1997) p. 3-12, http://hdl.handle.net/2115/24368; and 3) "Kogaku Sekkei no Kiso Chishiki (in Japanese)" (Mejiro Genossen Inc., Nov. 1, 2013) http://cgi3.genossen.co.jp/wordpress/wp-content/uploads/2013/11/94c979a4b6899c6 25f3d8cb0def5ca7c.pdf. This interference of light provides the distribution of amounts of the reflected light with "speckle pattern," i.e., distortions in striped or dotted pattern that correspond to the shape of fine irregularities on the reflecting surface. The speckle pattern is used in displacement determination as follows. See, for example, JP2013-257473, JP 2015-068809, and JP 2015-001557. A semiconductor laser irradiates a target with laser light, and an image sensor element such as a charge coupled device (CCD) captures light reflected by the target. Repeating the irradiation and capture operations provides a series of images of the target. Since the laser light has a wavelength of approximately 0.1 μm-1 μm, which is no more than a surface roughness of the target, speckle pattern appears in each image of the target. Due to movement of the target during the repetition of the capture operation, the speckle pattern generally varies among the continuous images. Since the speckle pattern reflects the fine structure of the target's surface, the speckle pattern of each image has a correlation with that of the next image, and a coefficient of the correlation is distributed in each image with a peak. Due to the movement of the target, the peak shifts from a location where the peak would appear if the target were at rest. By the ratio of the shift amount of the peak to the magnification of an optical system on the side of the image sensor, a displacement of the target is determined. Such a use of speckle pattern can increase precision of the displacement to the surface roughness of the target, i.e., the order of 1 μm.

A displacement sensor is equipped with a semiconductor laser, an image sensor element, and an arithmetic element for calculating a displacement of a target from a correlation of speckle pattern among continuous images of the target. Since these elements produce a large amount of heat during operation, optical systems of the sensor are probably subjected to high temperature. When the sensor is used in an image forming device, the optical system of the sensor also receives heat exhausted from the electric power source, controller, and fixing unit of the device. Accordingly, the sensor needs a technology for reducing an error of a displacement resulting from change in optical characteristics under high temperature environment, which is hereinafter referred to as "thermal aberration," such as change in wavelength of laser light with temperature fluctuation caused by the temperature dependency of laser oscillation, and deformation of optical elements and their support members caused by thermal expansion.

The technologies disclosed in JP 2013-257473 and JP 2015-068809 use an illumination optical system, which is of a collimating type, to convert a laser beam from a semiconductor laser into a parallel beam, and with it, irradiate a target. This reduces an error of a displacement regardless of change in the distance between the illumination optical system and the target caused by their temperature fluctuation.

The technologies disclosed in JP 2015-001557 and JP 2015-038457 use, in addition to an illumination optical system of a collimating type, an imaging optical system of a telecentric type to convert a laser beam reflected from a target into a parallel beam, and with it, irradiate an image sensor element. Thus, the displacement ratio of the target to speckle pattern is determined only from the magnification of the imaging optical system, and independent of the attributes of the illumination optical system. Accordingly, an error of a displacement resulting from thermal aberration is reduced if only change in magnification of the imaging optical system caused by its temperature fluctuation is sufficiently small, for example, if optical elements of the imaging optical system and their support members are made of material with low thermal expansion coefficient.

The technology disclosed in JP 2014-178637 uses illumination and imaging optical systems to convert their respective incident beams into converging beams. In this case, when the rate of thermal change in the focal point distance of the imaging optical system equals a specific value, an error of a displacement resulting from temperature aberration is constant and independent of ambient temperature. Accordingly, coincidence of the rate of thermal change in the focal point distance with the specific value reduces the error of a displacement resulting from thermal aberration.

The structure of illumination and imaging optical systems that are of a converging type has an additional advantage disclosed in JP 2011-123085. Converging light with which a target is irradiated enables speckle pattern to move in parallel over a longer distance, i.e., to achieve a longer correlation length than parallel light. The structure can thus achieve a higher upper limit of a displacement to be determined, and ensure, for a determined displacement, a higher degree of accuracy.

SUMMARY OF THE INVENTION

The above-described technologies for displacement sensors have the following problems. The structure including an illumination optical system of a collimating type and an imaging optical system of a telecentric type not only is relatively complex, but also causes a displacement ratio of a target to speckle pattern to be relatively vulnerable to a slight fluctuation of the magnification of the imaging optical system. Since the acceptable range for the fluctuation is thus too narrow, further reduction of an error of a displacement is difficult. The structure including illumination and imaging optical systems of a converging type reduces the accuracy of a mathematical expression of a displacement ratio of a target to speckle pattern when the image of a light source focused by the illumination optical system is located between the front and rear principal points of the imaging optical system. Thus, an error of a displacement increases when the temperature fluctuation of the illumination optical system causes the image of the light source to enter the area between the front and rear principal points of the imaging optical system.

An object of the invention is to solve the above-mentioned problems, and in particular, to provide a displacement sensor whose illumination and imaging optical systems are both constructed as a converging type and that can maintain detection error at a slight level regardless of the temperature aberration of any of the optical systems.

A displacement sensor according to one aspect of the invention is a type for detecting a displacement of a target, which is a movable member mounted in a device equipped with the displacement sensor or an object carried by the device. The displacement sensor includes an emission unit configured to emit laser light; an illumination optical system configured to convert the first laser light into first converging light, and irradiate with the first converging light a detection space through which the target moves; an imaging optical system configured to convert light reflected from the target into second converging light; a detection unit with a light-receiving surface to be irradiated by the second converging light, the detection unit configured to detect a distribution of amounts of the second converging light on the light-receiving surface; and a calculation unit configured to make the emission unit repeatedly emit the laser light and make the detection unit repeatedly detect the distribution of amounts of the second converging light while the target crosses the detection space, and based on a shift of speckle pattern indicated by a difference between the distributions of amounts of the second converging light detected at different times, calculate a displacement of the target. The imaging optical system has an optical axis along which a first image of the emission unit into which the illumination optical system focuses the laser light from the emission unit is displaced by a temperature change of the illumination optical system within a range of displacement that is limited to be located either anterior to a front principal point of the imaging optical system, or posterior to a rear principal point of the imaging optical system, by factors that include (a) distance between the emission unit and the front principal point of the illumination optical system, (b) a rear focal point distance of the illumination optical system, (c) amounts of respective changes of the distance and the rear focal point distance caused by a temperature change of the illumination optical system, and (d) location of the front principal point of the imaging optical system relative to the illumination optical system.

An image forming device according to one aspect of the invention comprises a conveying unit configured to convey a sheet; an image forming unit with a rotatable image carrier, configured to produce a toner image on the image carrier, and transfer the toner image from the image carrier onto a sheet that the conveying unit conveys; a monitor unit including the above-described displacement sensor and configured to use the displacement sensor to monitor a displacement or rotation angle of a target, which is a sheet conveyed by the conveying unit or the image carrier; and a controller unit configured to, based on the displacement or rotation angle that the monitor unit monitors, control the conveying unit or the image forming unit.

BRIEF DESCRIPTION OF THE DRAWINGS

These and other objects, advantages, and features of the invention will become apparent from the following description thereof taken in conjunction with the accompanying drawings which illustrate a specific embodiment of the invention. In the drawings:

FIGS. 11A and 11B are schematic views showing that a shift range of the first image point caused by temperature fluctuations of the illumination optical system in FIG. 8A is located anterior to and posterior to the principal point of the imaging optical system, respectively;

DETAILED DESCRIPTION

The following is a description of embodiments of the invention with reference to the drawings.

Appearance of Image Forming System

Figure 1:
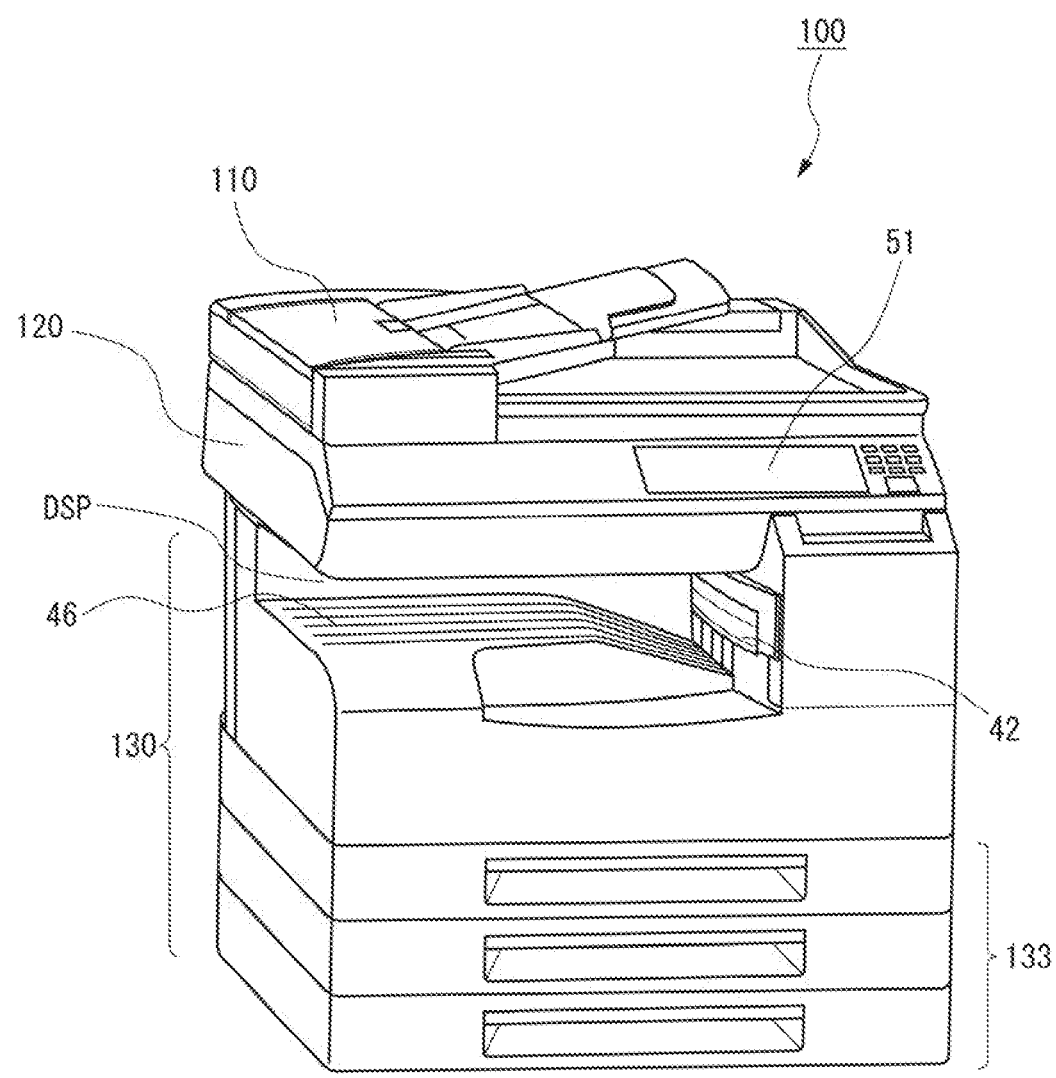
FIG. 1 is a perspective view of the appearance of an image forming device according to an embodiment of the invention.

FIG. 1 is a perspective view of the appearance of an image forming system according to an embodiment of the invention. The image forming system 100 is a multi-function peripheral (MFP), which combines functions of a scanner, color copier, and color laser printer. Referring to FIG. 1, the MFP 100 has, on the top surface of its body, an auto document feeder (ADF) 110 mounted in an openable and closable manner, and in front of the ADF 110, an operation panel 51 embedded. In an upper portion of the body directly below the ADF 110, the MFP 100 houses a scanner 120, and in a lower portion of the body, it includes a printer 130 with a lower portion to which paper cassettes 133 are attached to be able to slide out like drawers. The MFP 100 is of an in-body paper ejection type, i.e., it has, in a space DSP between the scanner 120 and the printer 130, an ejection tray 46 to which the MFP 100 ejects sheets from an ejection slot 42 located deep in the space DSP.

Internal Configuration of Printer

Figure 2:
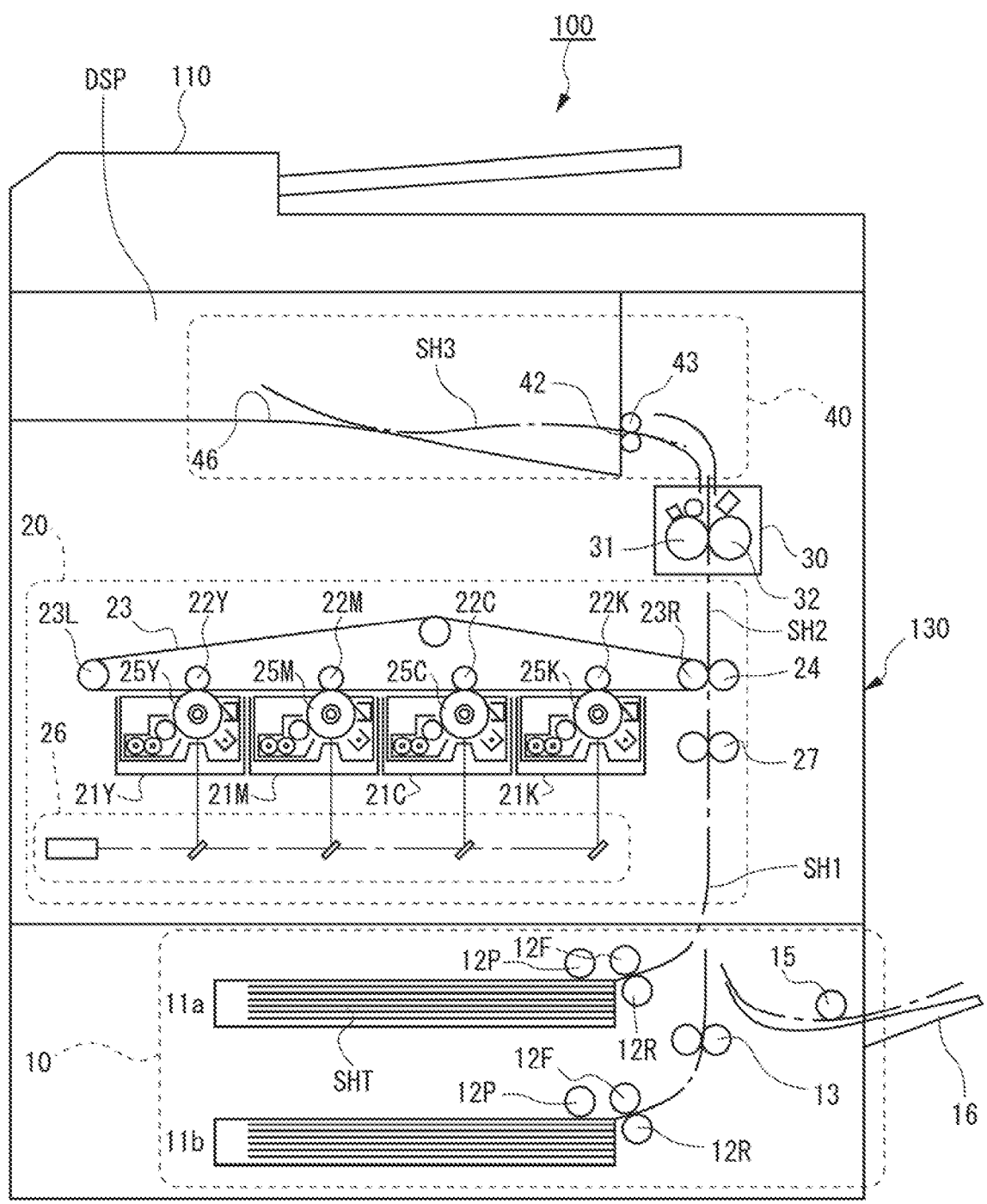
FIG. 2 is a front view schematically illustrating an internal configuration of the printer in FIG. 1.

FIG. 2 is a front view illustrating a schematic internal configuration of the printer 130. FIG. 2 represents elements inside the body of the printer 130 as if they can be seen through the front face of the body. Referring to FIG. 2, the printer 130 includes a feeder section 10, an imaging section 20, a fixing section 30, and an ejecting section 40.

The feeder section 10 uses pickup rollers 12P, 15, a feeder roller 12F, a separation roller 12R, and a vertical conveyance roller 13 to feed each sheet SH1 from a stack of sheets SHT stored in a paper cassette 11a or 11b or on a manual feed tray 16 to the imaging section 20. The material of the sheets SHT is paper or resin; their paper type is plain, high-quality, color-copier, coated, etc.; and their size is A3, A4, A5, B4, etc. They can be stored in the longitudinal or transverse position.

The imaging section 20 forms a toner image on a sheet SH2 conveyed from the feeder section 10. More specifically, at first, a timing roller 27 stops a sheet from either of the paper cassettes 11a, 11b or the manual feed tray 16, and then transfers the sheet to the nip between a driving roller 23R for an intermediate transfer belt 23 and a secondary transfer roller 24 at the time indicated by a driving signal from a main controller section 60, cf. FIG. 4. In parallel to these actions, four imaging units 21Y, 21M, 21C, 21K expose surfaces of their respective photoreceptor drums 25Y, 25M, 25C, 25K to laser beams from an exposure unit 26 in patterns based on image data, then forming electrostatic latent images on the surfaces. From the electrostatic latent images, the imaging units 21Y-21K next develop toner images of their respective colors, i.e., yellow (Y), magenta (M), cyan (C), and black (K). Since a different imaging unit uses different-colored toner, a toner image of each of the four colors appears on the surface of one of the photoreceptor drums 25Y-25K. The four monotone toner images then pass through the nips between the photoreceptor drums 25Y-25K and primary transfer rollers 22Y, 22M, 22C, 22K, and by electric fields therebetween, they are transferred in order onto the same position on a surface of the intermediate transfer belt 23. As a result, a single four-colored toner image is formed on the position, and further, when passing through the nip between the driving roller 23R for the intermediate transfer belt 23 and the secondary transfer roller 24, it is transferred by an electric field therebetween onto a surface of the sheet SH2 passing through the nip at the same time. After that, the secondary transfer roller 24 sends the sheet SH2 to the fixing unit 30.

The fixing section 30 thermally fixes the color toner image to the sheet SH2 conveyed from the imaging section 20. More specifically, when the sheet SH2 passes through the nip between a fixing roller 31 and a pressure roller 32, the fixing roller 31 applies heat from its built-in heater to the sheet SH2, and the pressure roller 32 applies pressure to the heated portion of the sheet SH2, pressing the sheet SH2 against the fixing roller 31. Since toner is thus fused with the surface of the sheet SH2, the toner image is fixed onto the surface.

The ejecting section 40 ejects to the ejection tray 46 a sheet on which a toner image is fixed. Referring to FIG. 2, the ejecting section 40 includes an ejection slot 42 and an ejecting roller 43. The ejection slot 42 is a horizontally elongated slot, which is open at a portion of the body of the MFP 100 faced to the space DSP. The ejecting roller 43 is disposed inside of the ejection slot 42, and by its rotating outer periphery, ejects a sheet SH3 coming from the top portion of the fixing section 30 through the ejection slot 42 to be stored on the ejection tray 46.

Conveyance Path of Sheets

Figure 3:
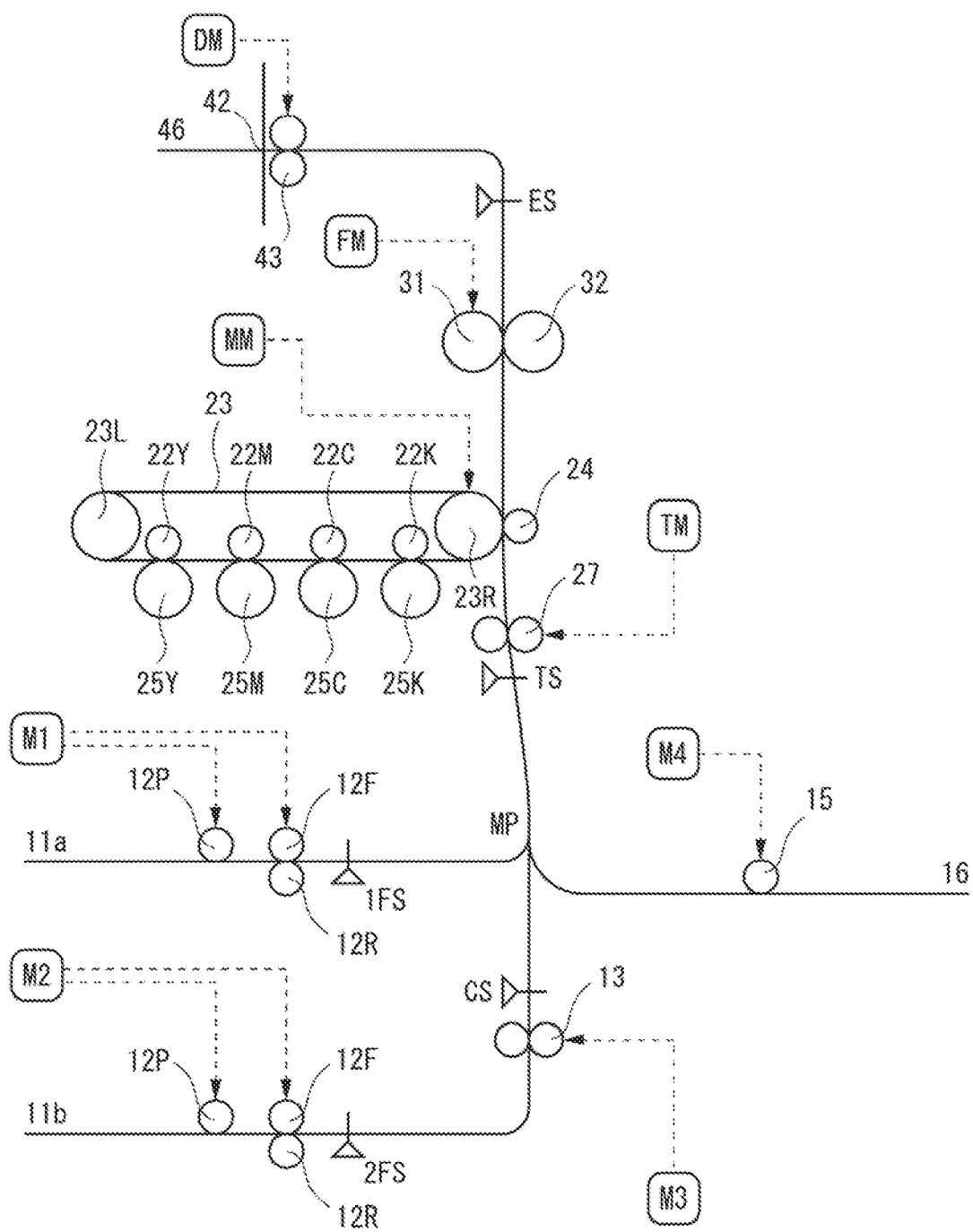
FIG. 3 is a schematic view of sheet conveyance paths in the printer in FIG. 1.

FIG. 3 is a schematic diagram showing conveyance paths of sheets built in the printer 130. Referring to FIG. 3, these paths include, in addition to the conveyance rollers 12P, 12F, 12R, 13, 15, 27, 23R, 24, 31, 32, and 43 shown in FIG. 2, a plurality of paper sensors 1FS, 2FS, CS, TS, and ES. Each of the paper sensors 1FS-ES monitors a sheet passing through a nearby portion of the paths. More concretely, each of the sensors 1FS-ES is an optical sensor, which includes an emission unit and a detection unit. The emission unit emits light of a predetermined wavelength such as infrared light. The detection unit detects light of the wavelength. While passing through the portion that each of the sensors 1FS-ES monitors, a sheet interrupts the light from its emission unit before its detection unit or reflects it to the detection unit. In response to this interruption or reflection, the detection unit changes its output, and thus the sensor detects the sheet as passing through the portion that it monitors.

Information on the detection of sheets by the paper sensors 1FS-ES is transferred by the feeder section 10, imaging section 20, fixing section 30, and ejecting section 40 to the main controller section 60. In response to the information, the main controller section 60 determines whether or not a paper jam occurs, i.e., whether or not the conveyance time of sheets is delayed by more than a threshold length. If a jam occurs, the main controller section 60 performs an error process including, e.g., an abort of the process by the MFP 100, and notification of the jam to a user by the display of the operation panel 51.

Feeder sensors 1FS, 2FS are placed at the start ends of the conveyance paths that are located near the paper cassettes 11a, 11b, respectively. Depending on whether or not the outputs of these sensors 1FS, 2FS indicate delay of a sheet passing, it is determined whether or not the group of feeder rollers 12P, 12F, and 12R feeds the sheet to the path at the proper time.

A vertical conveyance sensor CS, as well as the vertical conveyance roller 13, is included in the path from the second paper cassette 11b, and is placed before the point MP where the path merges with another path from the first paper cassette 11a. Depending on whether or not the output of this sensor CS indicates that delay of a sheet passing is more than a threshold time length, it is determined whether or not the vertical conveyance roller 13 sends the sheet to the merge point MP at the proper time. This threshold time length is predetermined based on fluctuation of the time required for the feeder section 10 to move a sheet from the second paper cassette 11b to the position that the sensor CS monitors.

A timing sensor TS, as well as the timing roller 27, is placed near the boundary between the feeder section 10 and the imaging section 20, and downstream of the merge point MP where the paths from the paper cassettes 11a, 11b merge with the path from the manual feed tray 16. Depending on whether or not the output of this sensor TS indicates that delay of a sheet passing is more than a threshold time length, it is determined whether or not the sheet reaches the timing roller 27 at the proper time, and whether or not it is transferred from the timing roller 27 at the proper time. This threshold time length is predetermined based on fluctuation of the time required for the feeder section 10 to move a sheet from the paper cassettes 11a, 11b, etc. to the position that the timing sensor TS monitors.

An ejection sensor ES is placed between the fixing section 30 and the ejection slot 42. Depending on whether or not the output of this sensor ES indicates that delay of a sheet passing is more than a threshold time length, it is determined whether or not the fixing roller 31 transfers the sheet at the proper time and whether or not the ejecting roller 43 draws the sheet at the proper time. This threshold time length is predetermined based on fluctuation of the time required for the fixing section 30 and the ejecting section 40 to move a sheet from the fixing section 30 to the ejection slot 42.

Referring further to FIG. 3, motors M1, M2, M3, M4, TM, MM, FM, DM for driving the conveyance rollers 12P-43 are provided around the conveyance paths. Each of the motors M1-DM is, for example, a brushless direct current motor (BLDC), which exerts torque through a transmission system such as gears and belts to a roller to be driven. Near the paper cassettes 11a, 11b, the feeder motors M1, M2 rotate the group of the feeder rollers 12P, 12F, and 12R. Near the path from the second paper cassette 11b, the vertical conveyance motor M3 rotates the vertical conveyance roller 13. Near the path from the manual feed tray 16, the feeder motor M4 rotates the feeder roller 15. Near the boundary between the feeder section 10 and the imaging section 20, the timing motor TM rotates the timing roller 27. In the imaging section 20, the main motor MM rotates the driving roller 23R for the intermediate transfer belt 23. In the fixing section 30, the fixing motor FM rotates the fixing roller 31. In the ejecting section 40, the ejection motor DM rotates the ejecting roller 43.

Electronic Control System of Image Forming System

Figure 4:
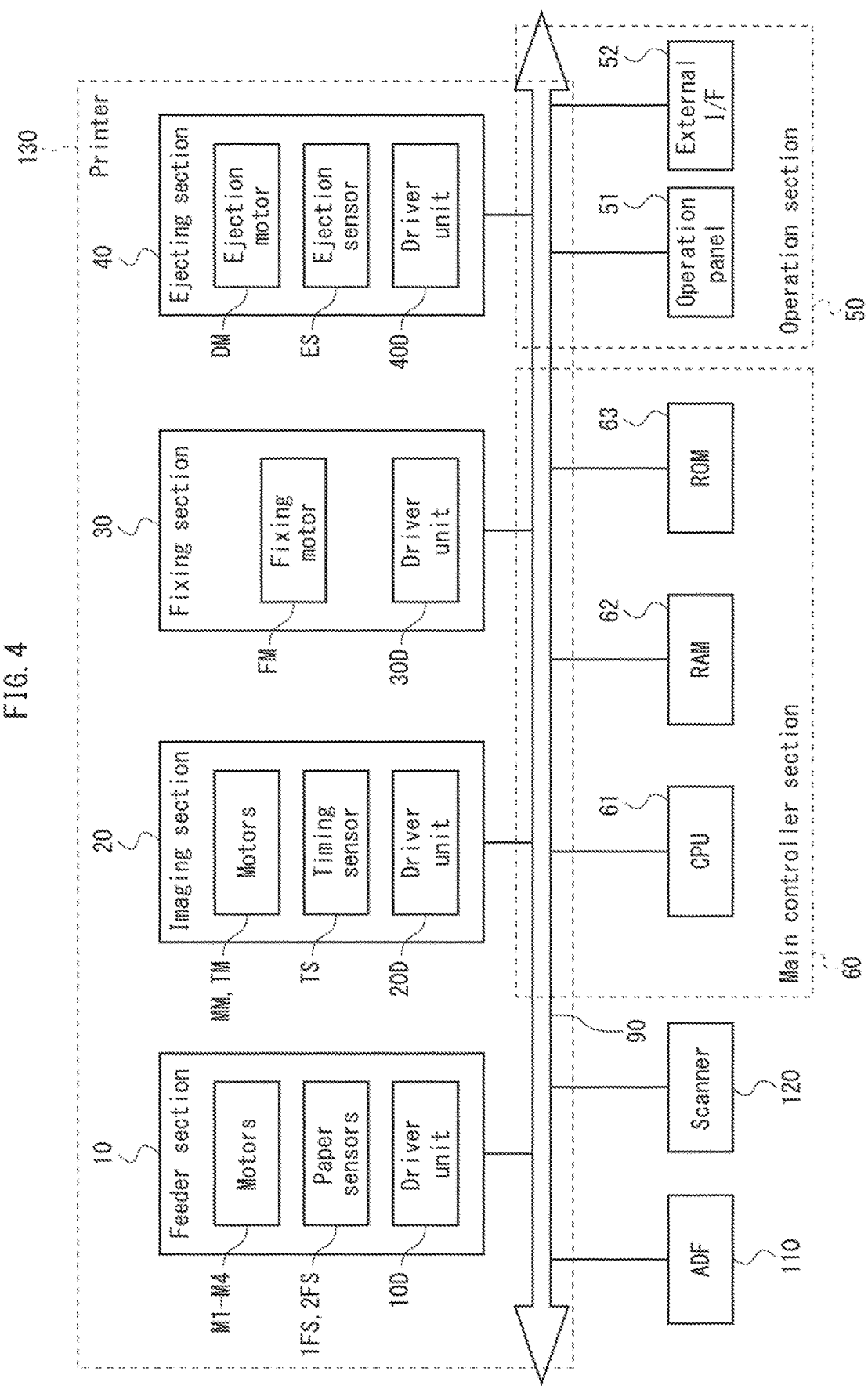
FIG. 4 is a block diagram illustrating a configuration of the electronic control system of the image forming device in FIG. 1.

FIG. 4 is a block diagram illustrating a configuration of the electronic control system of the MFP 100. Referring to FIG. 4, in this system, the ADF 110, the scanner 120, the printer 130, an operation section 50, and the main controller section 60 are connected to a bus 90 to be able to communicate with each other.

—Driver Unit of Printer—

The elements 10, 20, 30, 40 of the printer 130 include their respective driver units 10D, 20D, 30D, 40D, which control the conveyance rollers 12P-43 and other actuators for various movable members. Although not shown in FIG. 4, each of the driver units 10D-40D includes a control circuit and a driving circuit, in addition to the motors M1-DM in FIG. 3. The control circuit, which is configured with an integrated circuit such as a microprocessor (MPU/CPU), an application specific integrated circuit (ASIC), or a field programmable gate array (FPGA), instructs the driving circuit about the level of voltage to be applied to the motor based on an actual rotation speed fed back from the motor. The driving circuit is an inverter, which uses switching elements such as power transistors (FET) to apply a voltage to the motor. By feedback control using the control and driving circuits, each of the driver units 10D-40D maintains the sheet conveyance speed for the conveyance rollers 12P-43 at a target value indicated by the main controller section 60.

The driver units 10D-40D further use various sensors to monitor operating conditions of the elements 10-40 of the printer 130 and conveyance conditions of sheets. If detecting any failure from the conditions, the driver units 10D-40D inform the main controller section 60 of the failure. These sensors include, in addition to the paper sensors 1FS-ES in FIG. 3, a position sensor for detecting a location or position of a movable member such as the photoreceptor drums 25Y-25K or the fixing roller 31, a temperature sensor for detecting overheat of a motor for driving the movable member or its driving circuit, a sensor for detecting out of paper in the paper cassettes 11a, 11b, and a sensor for detecting out of toner in the imaging units 21Y-21K.

—Operation Section—

The operation section 50 accepts requests of jobs and image data to be printed through user operations or communication with external electronic devices, and informs of them the main controller section 60. Referring to FIG. 4, the operation section 50 includes the operation panel 51 and an external interface (I/F) 52. The operation panel 51 includes push buttons, a touch panel, and a display unit, as shown in FIG. 1. The operation panel 51 reproduces on the display unit a graphic user interface (GUI) screen such as an operation screen and an input screen for various parameters. The operation panel 51 also identifies a push button that a user presses, or detects a position on the touch panel where a user touches, then providing the main controller section 60 with information about the identification or detection as operation information. Especially when reproducing the input screen for a print job on the display, the operation panel 51 accepts, from a user, conditions about a print job such as the size and paper type of sheets to be printed, orientation, number, selection between color and monochrome, and image quality. The operation panel 51 incorporates items indicating these conditions into operation information. The external I/F 52 includes a universal serial bus (USB) port or memory card slot, and through it, reads image data to be printed directly from an external memory device such as a USB memory or a hard disk drive (HDD). The external I/F 52 also has a wired or wireless connection to an external network (not shown in FIG. 4), and receives image data to be printed from another electronic device on the network.

—Main Controller Section—

The main controller section 60 is an integrated circuit implemented on a printed circuit board, which is mounted inside the MFP 100. Referring to FIG. 4, the main controller section 60 includes a CPU 61, a RAM 62, and a ROM 63. The CPU 61, which is configured with a single MPU, executes a variety of firmware to realize various functions of control over the other elements 50, 110, 120, and 130. For example, the CPU 61 makes the operation section 50 display a GUI screen such as the operation screen and accept user's input operations. In response to each input operation, the CPU 61 selects an operation mode of the MFP 100 such as a running, waiting (low-power), or sleep mode, and instructs processes according to the operation mode to the other elements 110, 120, and 130. In particular, the CPU 61 selects a target value of the sheet conveyance speed and indicates it to the driver units 10D-40D of the elements 10-40 of the printer 130. The RAM 62, which is a volatile semiconductor memory device such as a dynamic RAM (DRAM) and a static RAM (SRAM), provides the CPU 61 with a workspace to execute firmware and stores image data to be printed that the operation section 50 accepts. The ROM 63 consists of a non-writable, non-volatile memory device and a rewritable non-volatile memory device. The former stores firmware; the latter includes a semiconductor memory device such as EEPROM, flash memory, or solid state drive (SSD), or a HDD, and provides the CPU 61 with storage for data such as environmental variables.

The main controller section 60 further monitors the operating conditions of the elements 110, 120, and 130 of the MFP 100, and if detecting any failure of them, changes operating modes adequately to resolve the failure. Especially when informed of a delay of sheet conveyance from the driver unit 10D-40D of the printer 130, the main controller section 60 responds to the information by aborting the printer 130 and instructing the operation panel 51 to display a message saying "a paper jam occurred" and urge a user to remove the jam. The main controller section 60 also responds in a similar manner when informed of overheating of one of the motors M1-DM for driving the conveyance rollers, its driving circuit, or the fixing roller 31, a paper shortage in the paper cassette 11a or 11b, or a toner shortage in the imaging units 21Y-21K.

Structure of Displacement Sensor

Of the conveyance rollers in FIG. 3, the feeder roller 12F, the timing roller 27, and the fixing roller 31 especially need to be controlled with high precision and at a high rate. The feeder roller 12F and timing roller 27 are controlled to make the time when and the speed at which a sheet enters the nip between the intermediate transfer belt 23 and the secondary transfer roller 24 coincide with the time when and the speed at which a toner image on the intermediate transfer belt 23 passes through the nip. The fixing roller 31 is controlled to rotate at a slightly higher speed than the secondary transfer roller 24, thus providing the sheet with appropriate tension to prevent it from being creased. More precise control of these rollers 12F, 27, and 31 entails a toner image transferred onto a proper position on the sheet with a higher degree of accuracy and with higher image quality.

In order to achieve a further higher degree of accuracy in drive control of these rollers 12F, 27, and 31, a displacement sensor according to an embodiment of the invention is adopted as at least one of the feeder sensors 1FS, 2FS, the timing sensor TS, and the ejection sensor ES. The feeder sensors 1FS, 2FS precisely and rapidly determine the displacements of sheets sent by the feeder rollers 12F and feed the displacements back to the driver unit 10D of the feeder section 10, which controls the feeder motors M1, M2. Similarly, the timing sensor TS feeds the displacements of sheets sent by the timing roller 27 back to the driver unit 20D of the imaging section 20, which controls the timing motor TM; the ejection sensor ES feeds the displacements of sheets sent by the fixing roller 31 back to the driver unit 30D of the fixing section 30, which controls the fixing motor FM. From the displacements, the driver units 10D-30D calculate the locations and velocities of sheets with high precision and in real time, and thus the drive control of the rollers 12F, 27, and 31 achieves a further higher degree of accuracy.

Figure 5A:
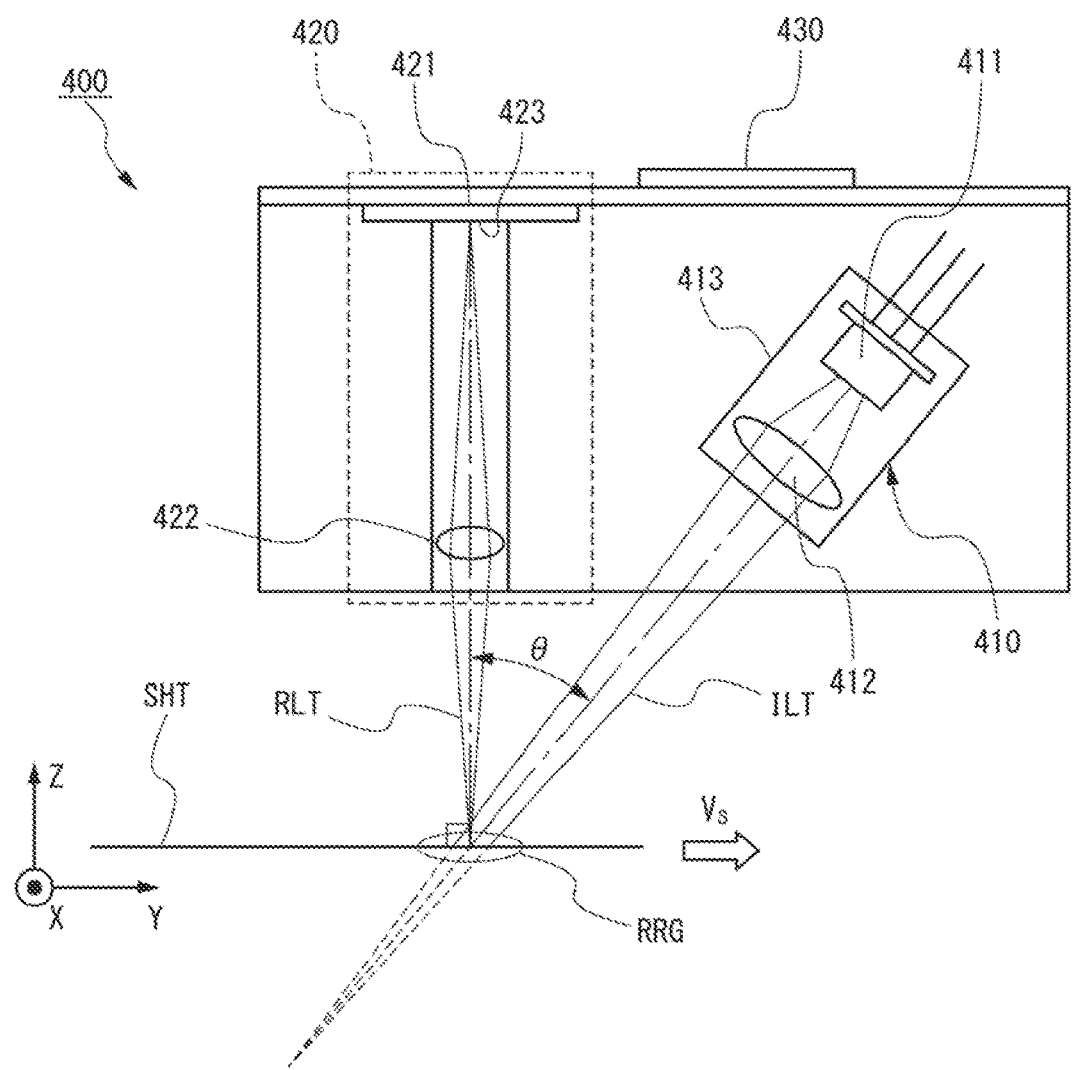
FIG. 5A is a schematic cross-section view showing a configuration of a displacement sensor according to an embodiment of the invention.

FIG. 5A is a schematic cross-section view showing the configuration of the displacement sensor 400. Referring to FIG. 5A, this sensor 400 includes an emission unit 410, detection unit 420, and control unit 430.

The emission unit 410 includes a light source 411, an illumination optical system 412, and a ball frame 413. The light source 411, which is a semiconductor laser, is located at a distance of several millimeters or a dozen of millimeters, for example, from a path for conveyance of a sheet SHT. The illumination optical system 412, which is of a converging type such as a convex lens, converts the laser beam from the light source 411 to a converging beam ILT, and with it, irradiates a predetermined range RRG in the path for conveyance of the sheet SHT. The ball frame 413, which is a cylinder-shaped body made of metal, e.g. aluminum (Al), or hard resin, supports the light source 411 and the illumination optical system 412 inside itself to fix a gap therebetween. A surface of the sheet SHT passing through the range RRG is irradiated with the laser beam ILT diagonally from the front of the sheet SHT. The incident angle θ of the laser beam ILT, i.e., the angle of the laser beam ILT with respect to the normal direction of the surface of the sheet SHT, which is the Z-axis direction in FIG. 5A, is set to a dozen of degrees, for example.

The detection unit 420 includes an image sensor element 421 and an imaging optical system 422. The image sensor element 421, which is a CMOS or CCD, includes a light-receiving surface 423 with a rectangular matrix of 128 by 32 pixels, for example. Each pixel has the size of a ⅛₀₀-inch square, nearly equal to a 32-μm square, and stores charges proportional in amount to incident light. The imaging optical system 422, which is of a converging type such as a convex lens, converts an incident beam RLT to a parallel beam, and with it, irradiates the light-receiving surface 423 of the image sensor element 421.

The detection unit 420 holds the light-receiving surface 423 of the image sensor element 421 at a distance of one dozen to some dozens of millimeters, for example, from the range RRG that the light source 411 irradiates with laser light, in a position parallel to the surface of the sheet SHT passing through the range RRG. The matrix of pixels is positioned such that its longer side is directed parallel to the direction of conveyance of the sheet SHT, which is the Y-axis direction in FIG. 5A. Thus, a laser beam RLT reflected from the surface of the sheet SHT passing through the range RRG to the normal direction of the surface, which is the Z-axis direction in FIG. 5A, travels through the imaging optical system 422 to the light-receiving surface 423 of the image sensor element 421. As a result, a charge distribution in the light-receiving surface 423 discretized into cells of a pixel size represents a distribution of amounts of light reflected from the range RRG, i.e., the image of the range RRG.

The control unit 430 is an electronic circuit such as an MPU/CPU, an ASIC, or a FPGA, implemented in one or more chips. The control unit 430 controls the light source 411 and the image sensor element 421 to capture a series of images of the surface of the sheet SHT at a constant frequency, e.g. at one-millisecond intervals, while the sheet SHT passes through the range RRG. The control unit 430 further compares two each of the series of images to calculate a displacement of the sheet SHT during the interval of capture of the two images.

Figure 5B:
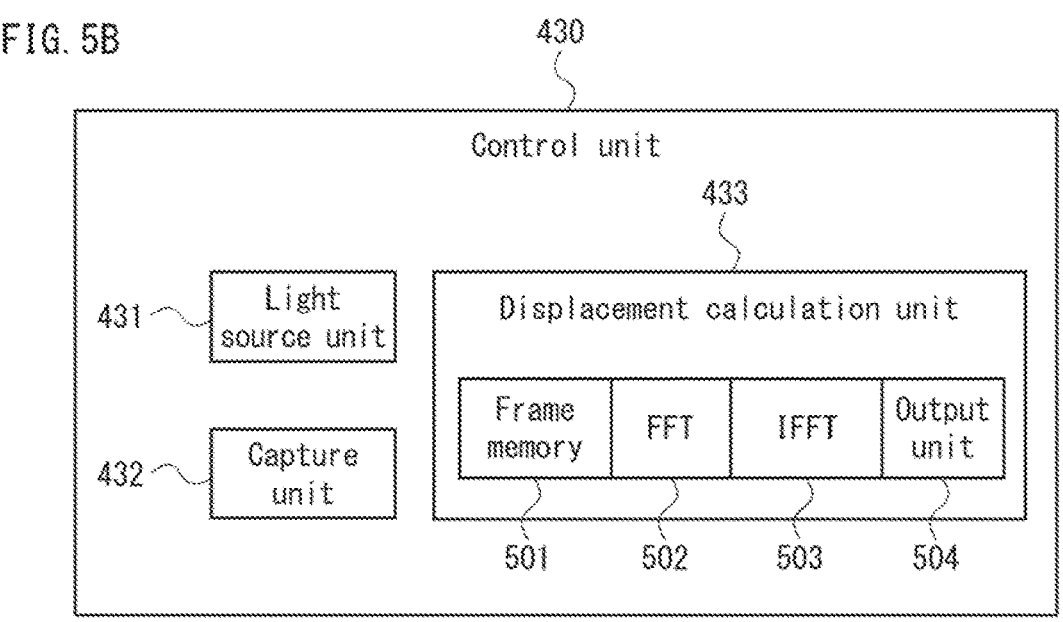
FIG. 5B is a functional block diagram of a control unit mounted in this sensor.

FIG. 5B is a functional block diagram of the control unit 430. Referring to FIG. 5B, the control unit 430 includes a light source unit 431, a capture unit 432, and a displacement calculation unit 433. The light source unit 431, which is a control circuit for the light source 411, adjusts current to be supplied to the light source 411 to keep the amount of laser light of the light source 411 at a target value for a predetermined time of exposure. The capture unit 432, which is a control circuit for the image sensor element 421, introduces charges stored in each pixel of the image sensor unit 421, and based on the amount of a current flow caused by the introduction, generates data representing a single image, which is hereinafter referred to as a "frame." The capture unit 432 repeats these actions at sampling intervals to produce one each of a series of frames per sampling interval. The displacement calculation unit 433 compares two each of the series of frames to detect a temporal change of the images, and from the change, calculates a displacement of the target.

Referring further to FIG. 5B, the displacement calculation unit 433 includes a frame memory 501, a fast Fourier transform (FFT) unit 502, an inverse FFT (IFFT) unit 503, and an output unit 504. The frame memory 501 is a volatile memory device such as a DRAM and SRAM, which can store up to two frames therein. The FFT unit 502 performs FFT on one frame read into the frame memory 501. The IFFT unit 503 calculates the product of two frames after FFT that are stored in the frame memory 501, and performs IFFT on the product to calculate coefficients of correlation between these two frames. The output unit 504 uses the IFFT unit 503 to search for a peak of the coefficients of correlation between two frames stored in the frame memory 501. From the location of the peak, the output unit 504 calculates a displacement of the sheet, then provides the calculated value to the driver unit 10D, 20D of the feeder section 10 or the imaging section 20.

Action Principle of Displacement Sensor

The displacement sensor 400 continuously captures speckles caused by fine irregularities on the surface of a target. From changes in speckle pattern among a series of images, the displacement sensor 400 measures a displacement of the target with the same precision as the typical scale of speckle pattern, e.g. with a precision of a few micrometers.

Figure 6A:
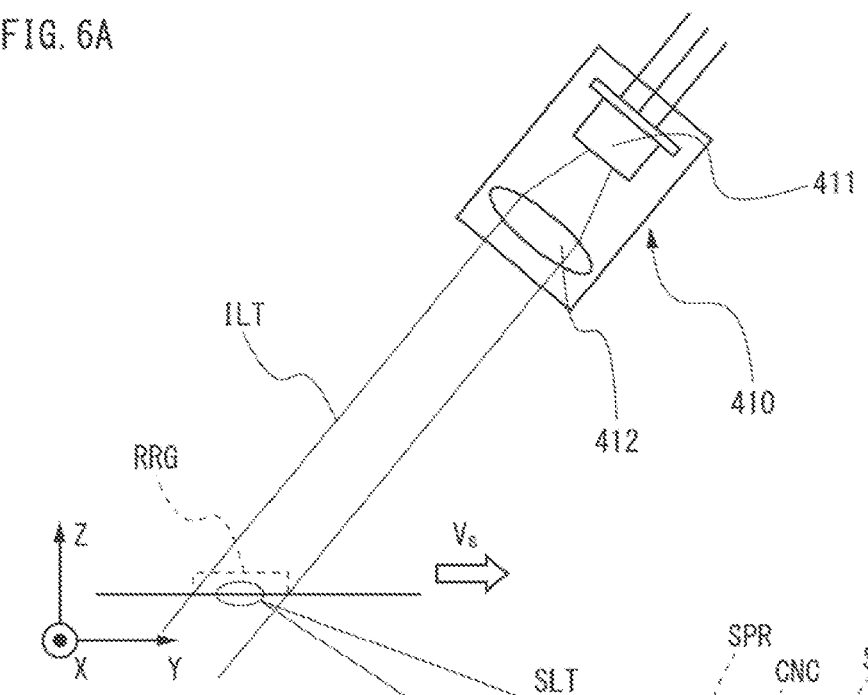
FIG. 6A is a schematic view of fine irregularities on an irradiated area diffusely reflecting light from the emission unit in FIG. 5A.

FIG. 6A is a schematic view of fine irregularities 602 on an irradiated area diffusely reflecting laser beams ILT, which have been emitted from the emission unit 410. When the irradiated area is the surface of a sheet, the irregularities 602 are caused by graded concentration of toner or ink attached to the surface, or undulations of the surface caused by random alignment of fibers constituting the sheet; the irregularities 602 has a typical size in the order of 1 µm. More concretely, when the light source 411 is an infrared semiconductor laser, the laser beam ILT has a wavelength λ of 700 nm-2000 nm, the same order as the size of the irregularities 602, i.e., the order of 1 µm. Accordingly, speckles appear on the irradiated area, as shown in the enlarged portion of FIG. 6A. Specifically, first domains SPR, in which light beams SLT scattered by the irregularities 602 reinforce one another, emit more intense reflected light than other domains; second domains CNC, in which scattered light beams SLT cancel one another, emit less intense reflected light than other domains.

Figure 6B:
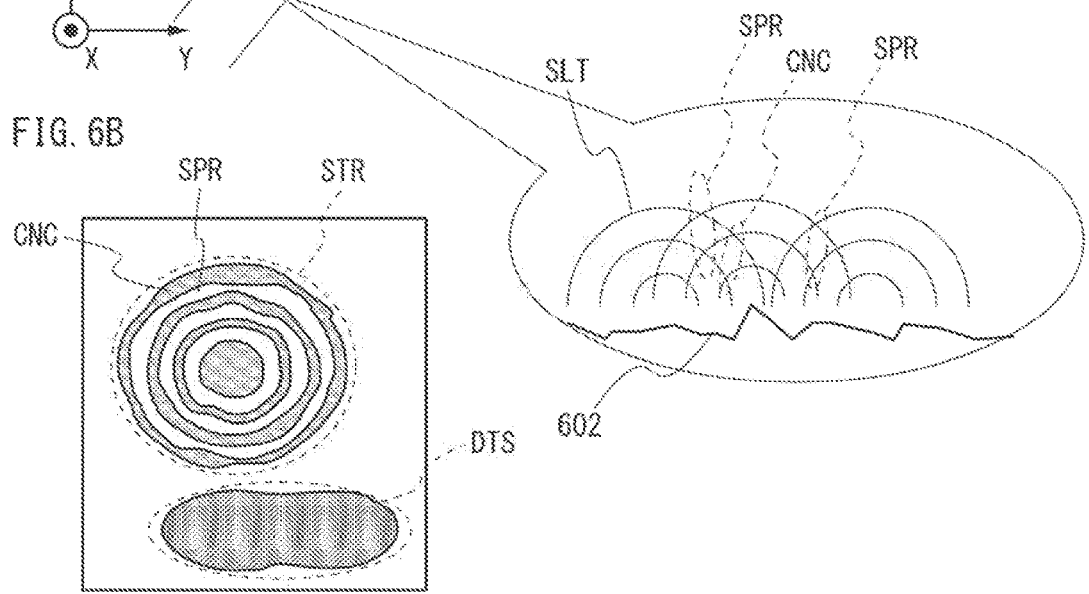
FIG. 6B is a schematic view of speckle pattern appearing on an image captured by the image sensor element in FIG. 5A.
Figure 6C:
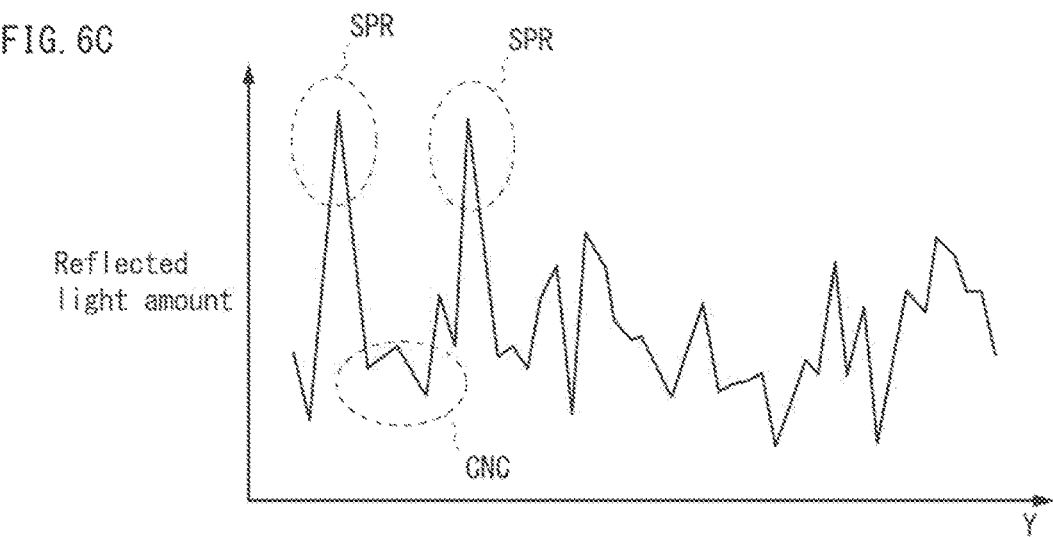
FIG. 6C is a graph of a distribution of reflected light amounts with the speckle pattern.

FIG. 6B is a schematic view of speckle pattern STR appearing on an image captured by the image sensor element 421. FIG. 6C is a graph of a distribution of reflected light amounts with the speckle pattern STR. Since the irregularities 602 on the irradiated area are randomly shaped, the first and second domains SPR, CNC in which the scattered light beams SLT reinforce and cancel one another, respectively, are randomly distributed. Accordingly, as shown in FIG. 6C, peaks and troughs randomly appear in the distribution of reflected light amounts; the peaks are caused by the first domains SPR and the troughs are caused by the second domains CNC. This results in speckle pattern in a form of randomly striped pattern STR or randomly dotted pattern DTS, as shown in FIG. 6B. These patterns STR and DTS reflect the pattern of irregularities 602 on the irradiated area, thus being intrinsic to each local portion of the irradiated area. This enables a feature of the speckle pattern STR or DTS to be used to differentiate local portions of the irradiated area, and in particular, detection of specific speckle patterns STR or DTS within an image can reveal where a corresponding local portion is located within the image.

Figure 7A:
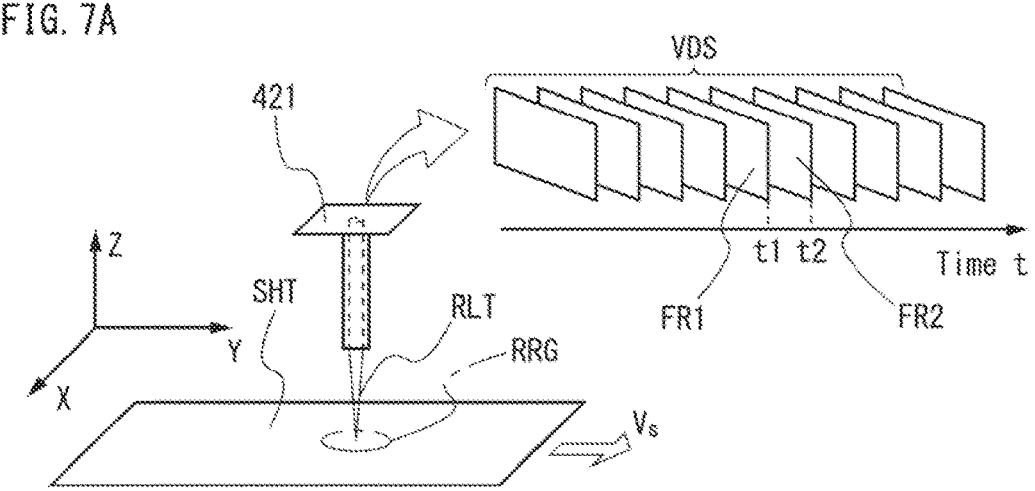
FIG. 7A is a schematic view of a series of images captured by the image sensor element in FIG. 5A.

FIG. 7A is a schematic view of a series of images VDS that the image sensor element 421 continuously captured at the sampling intervals. Referring to FIG. 7A, this series VDS shows a shift per sampling interval of the surface of the sheet SHT passing through the range RRG. In the series VDS, the displacement calculation unit 433 detects pieces of speckle pattern with a common feature, and thus traces the shift of the pieces of speckle pattern within the series.

Figure 7B:
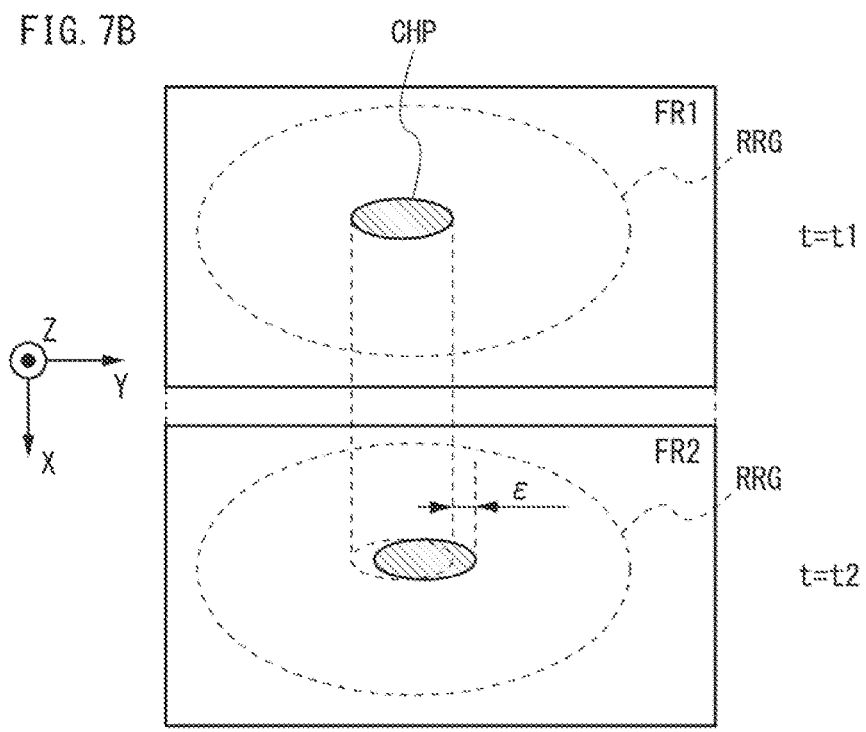
FIG. 7B is a schematic view of the shift of pattern with a common feature between two contiguous images of the series.

FIG. 7B is a schematic view of the shift of pattern CHP with a common feature between two contiguous images FR1, FR2 of the series VDS. Referring to FIG. 7B, one image FR1 shows, within the surface of the sheet SHT, a portion located in the range RRG at a first time t=t1, and the other image FR2 shows another portion located in the range RRG at a second time t=t2 (>t1). The difference t2−t1 between the first and second times is equal to the length of the sampling interval, e.g. 80 µsec-100 µsec. Even during this tiny difference t2−t1, the sheet SHT travels in the conveyance direction, the Y-axis direction in FIG. 7B. The displacement calculation unit 433 compares brightness distributions between these two images FR1, FR2 to detect portions CHP with the same feature and to determine a displacement ε of the portions within the images. The product of this displacement ε and the magnification of the imaging optical system 422 is assigned to a displacement of the sheet SHT during the period from the first time t1 to the second time t2.

More concretely, the displacement calculation unit 433 calculates the correlation coefficient of brightness distributions between the two images FR1, FR2 as a function of a distance s between pixels to be compared, which is in general a vector, by the following eq. (1), for example:

$$LM1*LM2(s)=F^{-1}[F[LM1(\bullet)]\times F[LM2(\bullet+s)]] \quad (1)$$

The function LM1(•) represents brightness distribution of the image at the first time t1, and the function LM2(•) represents brightness distribution of the image at the second time t2. The transform F[•] for these functions LM1, LM2 represents the Fourier transform for them, and its inverse transform F⁻¹[•] represents the inverse Fourier transform for them.

Figure 7C:
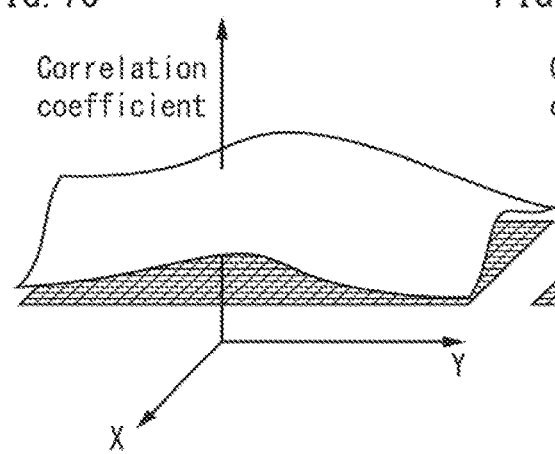
FIG. 7C is a graph showing a distribution of correlation coefficients between the two images.
Figure 7D:
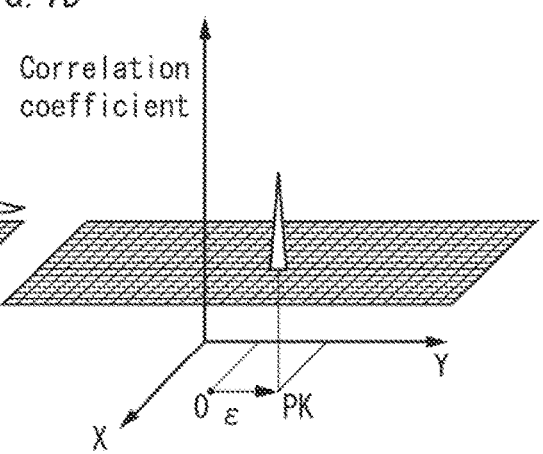
FIG. 7D is a graph showing the distribution after removal of background noises.

FIG. 7C is a graph showing distribution of correlation coefficients LM1*LM2(s) between the two images FR1, FR2. FIG. 7D is a graph showing the distribution after removal of background noises. Referring to FIGS. 7C and 7D, both the graphs are expressed as a histogram on a pixel-sized mesh. As shown in FIG. 7C, the distribution of correlation coefficients calculated from eq. (1) is typically expressed as a curved surface that is smooth but largely undulating throughout each image. Most of the undulation is caused by distributed background noises, and in particular, reflects the variation in intensity of the laser beams ILT. Accordingly, the rate of fluctuation of the background noises is sufficiently lower than the conveyance speed of the sheet SHT. Thus, the Fourier-transformed brightness distribution F[LM1(•)], F[LM2(•)] of each image FR1, FR2 is processed with a highpass filter, for example, before the calculation of eq. (1), thus losing its low frequency components. As a result, most of the gradual undulation of the curved surface shown in FIG. 7C is removed as shown in FIG. 7D, and then a peak PK appears in the distribution of correlation coefficients.

The position of this peak PK indicates the shift of speckle pattern between the two images FR1, FR2, caused by the sheet moving. Indeed, the brightness distribution of both the images FR1, FR2 represent speckle patterning caused by the irregularities on the same sheet surface, thus including, in general, two or more common forms corresponding to the same local portions of the sheet surface. These common forms indicate shifts between the images FR1, FR2 caused by the sheet SHT travelling for the period from the first time t1 to the second time t2, and thus, all the common forms have the same shift amount (vector) ε. Accordingly, both the brightness of a pixel located at a coordinate in the image FR1 at the first time t1 and the brightness of another pixel separated from the same coordinate by the common shift amount ε in the image FR2 at the second time t2 indicate an amount of light reflected from the same local portion of the sheet surface. These pixels correlate closely with each other, and thus, the peak PK of correlation coefficients appears at a location separated from the origin s=0 by the common shift amount ε. The displacement calculation unit 433 calculates the amount ε of shift of the peak PK from the origin s=0, and determines the product of the amount ε and the magnification of the imaging optical system 422 as a displacement of the sheet SHT from the first time t1 to the second time t2.

Optical Arrangement of Displacement Sensor

Figure 8A:
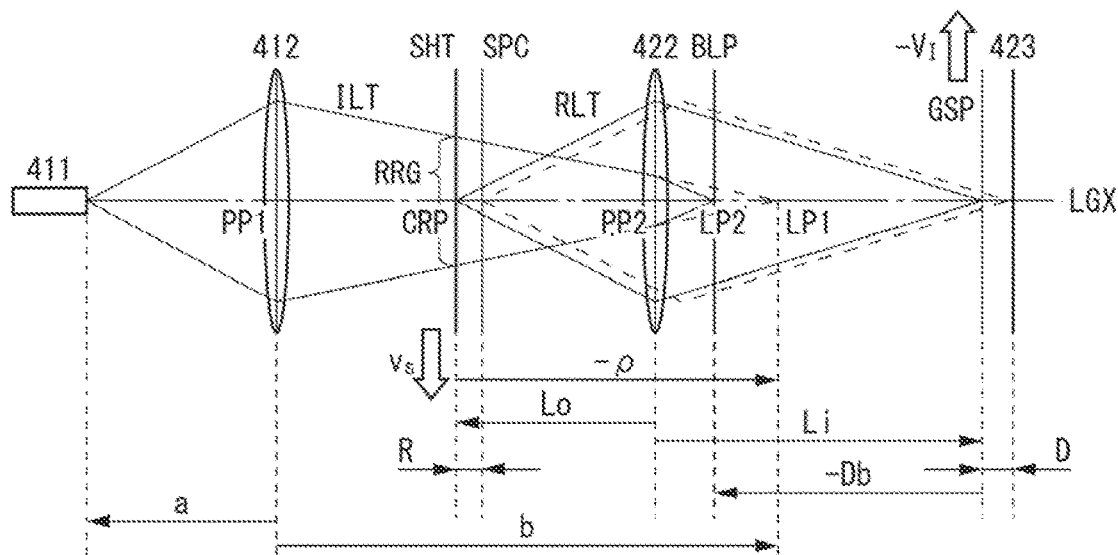
FIG. 8A is a diagram showing an optical arrangement of the displacement sensor in FIG. 5A.

FIG. 8A shows an optical arrangement of the displacement sensor 400, which expresses the illumination optical system 412 as a single convex lens with a single principal point PP1, and the imaging optical system 422 as a single convex lens with a single principal point PP2. This means that these convex lenses are approximated as a "thin" lens, i.e., their thicknesses are ignored relative to their focal point distances.

—Illumination Optical System—

The illumination optical system 412 irradiates the range RRG in the conveyance path with a laser beam from the light source 411, and in particular, converges the irradiated light beam ILT to a first image point LP1, which is the conjugate point of the light source 411 with respect to the illumination optical system 412. Accordingly, the distances a, b of the light source 411 and the first image point LP1, respectively, from the principal point PP1 of the illumination optical system 412, together with the focal point distance $f_S$ of the illumination optical system 412, satisfy the following eq. (2) under the "thin-lens" approximation:

$$\frac{1}{f_S} = \frac{1}{a} + \frac{1}{b}. \quad (2)$$

As shown in FIG. 8A, a laser beam emitted from the light source 411 along the optical axis LGX usually spreads in a plane perpendicular to the optical axis LGX. Within the spread, i.e., the beam radius, light intensity usually shows a Gaussian distribution. When a laser beam with a Gaussian distribution, i.e., a Gaussian beam is converted to a converging beam ILT through the illumination optical system 412, the converted beam radius w reaches the minimum $w_0$ at the first image point LP1. This minimum $w_0$ is larger than zero: $w_0 > 0$. When a z-coordinate system is set along the optical axis LGX, its origin z=0 is assigned to the image point LP1, and its positive direction is assigned to the direction of laser beam travel, a beam radius w and a wavefront curvature radius ρ are expressed by the following equations (3a) and (3b), respectively, with a wavelength λ:

$$w = w(z) = w_0 \sqrt{1 + \frac{z^2}{z_R^2}}, \quad (3a)$$

$$\rho = \rho(z) = z\left(1 + \frac{z_R^2}{z^2}\right), \quad z_R = \frac{\pi w_0^2}{\lambda}. \quad (3b)$$

For details, see the above-listed reference 1.

Figure 8B:
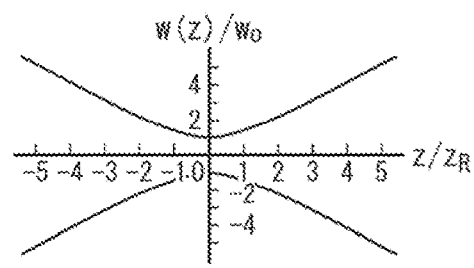
FIG. 8B is a graph showing a relationship between the radius w of a Gaussian beam and a coordinate z along an optical axis.

FIG. 8B is a graph showing a relationship between the radius w of a Gaussian beam and a coordinate z along the optical axis LGX. While the coordinate z increases in the negative section, the beam radius w decreases monotonically and reaches the minimum $w_0$ at the first image point LP1, z=0. While the coordinate z increases in the positive section, the beam radius w increases monotonically. Thus, in the vicinity of the first image point LP1, $-z_R \leq z \leq z_R$, the laser beam spread has a "waist," which is referred to as "beam waist." The minimum $w_0$ of the beam radius w is referred to as "waist radius."

Figure 8C:
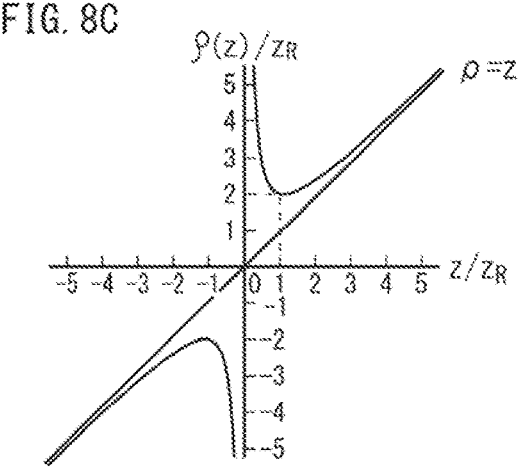
FIG. 8C is a graph showing a relationship between the radius $\rho$ of wavefront curvature of a Gaussian beam and a coordinate z along an optical axis.

FIG. 8C is a graph showing a relationship between the wavefront curvature radius ρ of the Gaussian beam and the coordinate z along the optical axis LGX. This Gaussian beam, by penetrating through the illumination optical system 412, causes the beam waist to appear with its center located at the first image point LP1, z=0. Accordingly, the wavefront curvature radius ρ is negative, ρ<0, in the section in front of the first image point LP1, z<0. The wavefront curvature radius ρ is nearly equal to the coordinate z, ρ≈z, in sections sufficiently distant from the first image point LP1, $z \ll -z_R$, $z \gg z_R$. Inside the beam waist, $-z_R \leq z \leq z_R$, the absolute value of the wavefront curvature radius, −ρ, sharply increases with the decreasing distance from the first image point LP1, and diverges at the first image point LP1: ρ≈1/z, z→0. That is, the laser beam corresponds to a plane wave at the first image point LP1.

The converging light beam ILT from the illumination optical system 412 is reflected by a surface of the sheet SHT passing through the irradiated range RRG in the conveyance path. When the wavelength λ of the laser beam is in the order of 0.1 μm, for example, and the distance Lo from the principal point PP2 of the imaging optical system 422 to the surface of the sheet SHT is some dozens of millimeters, the illumination optical system 412 is designed to have the waist radius $w_0$ of a few micrometers. In this case, the constant $z_R$, which is called "Rayleigh length," is in the order of 1 μm and sufficiently shorter than the distance Lo from the principal point PP2 of the imaging optical system 422 to the surface of the sheet SHT. Accordingly, under an approximation that the Rayleigh length $z_R$ is ignored relative to the distance Lo, the absolute value of the wavefront curvature radius, –ρ, of the laser beam at the reflection from the surface of the sheet SHT, which is hereinafter abbreviated to "reflected-wavefront curvature radius," equals the distance from the surface of the sheet SHT to the first image point LP1.

—Imaging Optical System—

The imaging optical system 422 converges the light beam reflected by the surface of the sheet SHT. In particular, it focuses the light beam RLT reflected from the intersection CRP of the surface of the sheet SHT with the optical axis LGX, on a virtual plane GSP whose location relative to the imaging optical system 422 is conjugate to the location of the surface of the sheet SHT. The virtual plane GSP is hereinafter referred to as "image plane." On the light-receiving surface 423 of the image sensor element located at a distance D from the image plane GSP, the imaging optical system 422 focuses the image of speckle occurring in a plane at a distance R from the surface of the sheet SHT. These distances D, R are positive when measured in the travel direction of the reflected light beam RLT. The speckle-occurring plane SPC and the light-receiving surface 423 of the image sensor element, as well as the surface of the sheet SHT and its image plane GSP, are located relative to the imaging optical system 422 so that they are conjugate to each other.

The light beam reflected from the surface of the sheet SHT includes components traveling toward the first image point LP1 of the light source 411. The imaging optical system 422 converges these components to a second image point LP2, which is the conjugate point of the first image point LP1 with respect to the imaging optical system 422. Accordingly, measured from the principal point PP2 of the imaging optical system 422, the distance Lo of the surface of the sheet SHT, the distance Li of the image plane GSP of the sheet SHT, the distance Lo–R of the speckle-occurring plane SPC, the distance Li+D of the light-receiving plane 423 of the image sensor element, the distance Lo–(–ρ) of the first image point LP1, and the distance Li–(–Db) of the second image point LP2, together with the focal point distance $f_I$ of the imaging optical system 422, satisfy the following eq. (4) under the "thin-lens" approximation:

$$\frac{1}{f_I} = \frac{1}{Lo} + \frac{1}{Li} = \frac{1}{Lo-R} + \frac{1}{Li+D} = \frac{1}{Lo+\rho} + \frac{1}{Li+Db}. \quad (4)$$

—Boiling Surface—

If the imaging optical system 422 does not exist, a boiling surface appears at a distance of the reflected-wavefront curvature radius –ρ from the surface of the sheet SHT. (For details, see the above-listed reference 1.) The "boiling surface" is a virtual plane perpendicular to the optical axis LGX. What is observed from the temporal changes of speckle pattern appearing in this plane is not translation of speckle caused by the movement of the sheet SHT, but boiling movement of speckle only. "Boiling movement" is movement of speckles that change their shapes while staying at the same locations, as if they were air bubbles being formed from boiling water. The boiling surface is located at the first image point LP1 since the reflected-wavefront curvature radius –ρ can be considered as being equal to the distance from the surface of the sheet SHT to the first image point LP1.

Actually, the imaging optical system 422 does exist, and thus the boiling surface does not always appear at the first image point LP1 as a real image. In the example in FIG. 8A, the first image point LP1 is located behind the principal point PP2 of the imaging optical system 422, and thus the imaging optical system 422 converges a light beam traveling toward the first image point LP1 to the second image point LP2. In this case, the boiling surface BLP appears, not at the first image point LP1, but at the second image point LP2, i.e., the image point of the light source 411 formed by the entirety of the optical systems 412, 422. The distance Db of the boiling surface BLP from the image surface GSP of the sheet, which is positive when measured in the travel direction of the reflected light beam RLT, is hereinafter referred to as "boiling surface position." This position Db is expressed by the following eq. (5), which is modified from eq. (4), with the distance Lo from the principal point PP2 of the imaging optical system 422 to the surface of the sheet SHT, the reflected-wavefront curvature radius –ρ, and the focal point distance $f_I$ of the imaging optical system 422:

$$Db = \frac{-\rho f_I^2}{(Lo - f_I)(Lo - f_I + \rho)}. \quad (5)$$

Since the imaging optical system 422 converges the light beam reflected from the surface of the sheet SHT to the light-receiving surface 423 of the image sensor element, the distance Lo of the surface of the sheet SHT from the principal point PP2 of the imaging optical system 422 is longer than the focal point distance $f_I$ of the imaging optical system 422: Lo>$f_I$. Measured from this principal point PP2, the image of the light source 411 focused by the illumination optical system 412, i.e., the first image point LP1 is located at a distance of the difference, Lo–(–ρ), between the distance Lo of the surface of the sheet SHT and the reflected-wavefront curvature radius –ρ. Depending on this distance Lo+ρ, i.e., the location of the first image point LP1 relative to the principal point PP2 of the imaging optical system 422, eq. (5) reveals the following five cases; see reference 1.

[1] Distance Lo+ρ>Focal Point Distance $f_I$ of Imaging Optical System 422

Figure 9A:
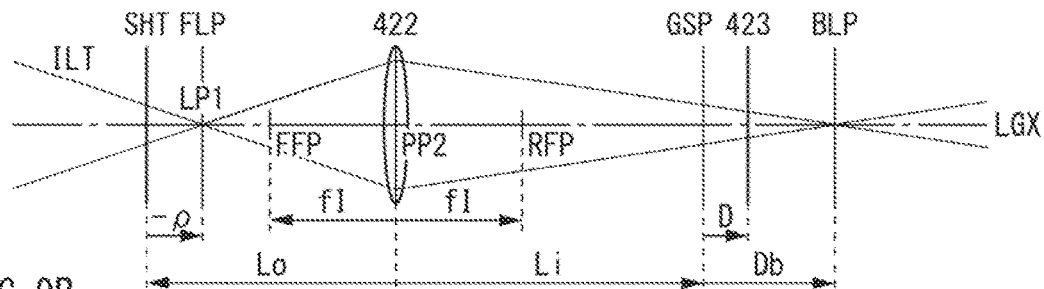
FIG. 9A shows an optical arrangement of the case where the distance $Lo+\rho$ from the principal point of the imaging optical system in FIG. 8A to a first image point is longer than the focal point distance $f_1$ of the imaging optical system.

FIG. 9A shows an optical arrangement of the case where the distance Lo+ρ from the principal point PP2 of the imaging optical system 422 to the first image point LP1 is longer than the focal point distance $f_I$ of the imaging optical system 422. In this case, the first image point LP1 is located between the surface of the sheet SHT and the front focal point FFP of the imaging optical system 422, and accordingly two boiling surfaces, a front one FLP and a rear one BLP, appear at the first image point LP1 and the second image point LP2, respectively. From eq. (5), the position Db of the rear boiling surface BLP is positive: Db>0, i.e., the rear boiling surface BLP is located behind the image plane CSP of the sheet.

[2] Distance Lo+ρ=Focal Point Distance $f_I$ of the Imaging Optical System 422

Figure 9B:
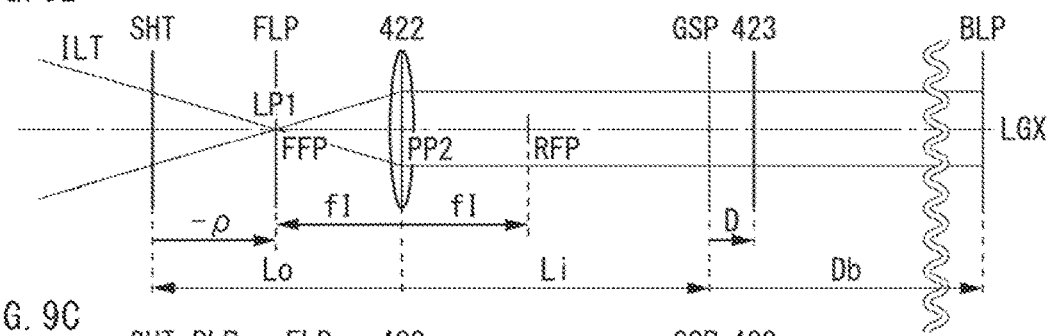
FIG. 9B shows an optical arrangement of the case where the distance $Lo+\rho$ is equal to the focal point distance $f_1$.

FIG. 9B shows an optical arrangement of the case where the distance Lo+ρ from the principal point PP2 of the imaging optical system 422 to the first image point LP1 is equal to the focal point distance $f_I$ of the imaging optical system 422. In this case, the first image point LP1 is located at the front focal point FFP of the imaging optical system 422, and accordingly the front boiling surface FLP appears at the first image point LP1. From eq. (5), the position Db of the rear boiling surface BLP diverges to positive infinity: Db→+∞. Since the beam from the front focal point FFP of the imaging optical system 422 is converted by the imaging optical system 422 to a parallel beam, the rear boiling surface BLP is virtually located at infinity distance behind the image plane GSP of the sheet. Concretely, the rear boiling surface BLP disappears from the image side of the imaging optical system 422, i.e., the volume in which the light-receiving surface 423 of the image sensor element can be disposed.

[3] 0<Distance Lo+ρ<Focal Point Distance $f_1$ of Imaging Optical System 422

Figure 9C:
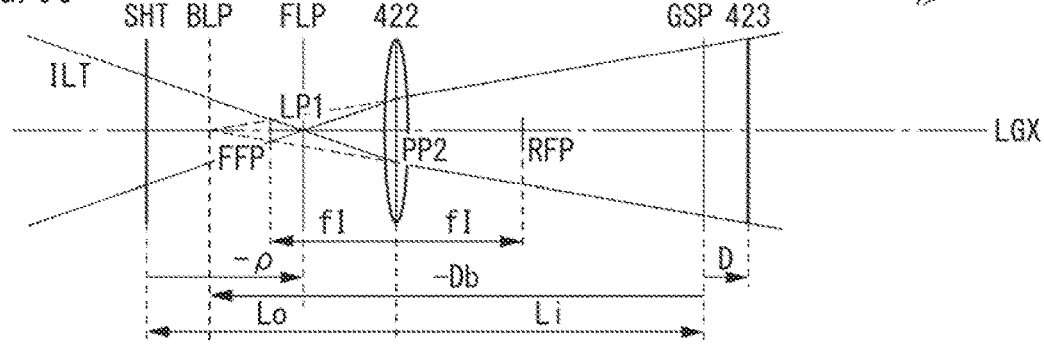
FIG. 9C shows an optical arrangement of the case where the distance $Lo+\rho$ is a positive value shorter than the focal point distance $f_1$.

FIG. 9C shows an optical arrangement of the case where the distance Lo+ρ from the principal point PP2 of the imaging optical system 422 to the first image point LP1 is a positive value smaller than the focal point distance $f_1$ of the imaging optical system 422. In this case, the first image point LP1 is located between the front focal point FFP and principal point PP2 of the imaging optical system 422, and accordingly the front boiling surface FLP appears at the first image point LP1. From eqs. (4) and (5), the position Db of the rear boiling surface BLP satisfies the following inequality: Db<−Lo·$f_1$/(Lo−$f_1$)=−Lo·M=−Lo. The factor M denotes the magnification of the imaging optical system 422, i.e., the ratio in size between an object on the surface of the sheet SHT and its image on the image plane GSP. The term "magnification" is hereinafter used to mean this definition unless otherwise noted. The factor M is thus equal to the ratio of the distance Li of the image plane GSP from the principal point PP2 of the imaging optical system 422 to the distance Lo of the surface of the sheet SHT from the principal point PP2: M=Li/Lo=$f_1$/(Lo−$f_1$), because of eq. (4). Since the inequality Db<−Li is satisfied, the rear boiling surface BLP is located in front of the principal point PP2 of the imaging optical system 422. This means that the rear boiling surface BLP is not a real image but a virtual one.

[4] Distance Lo+ρ=0

Figure 9D:
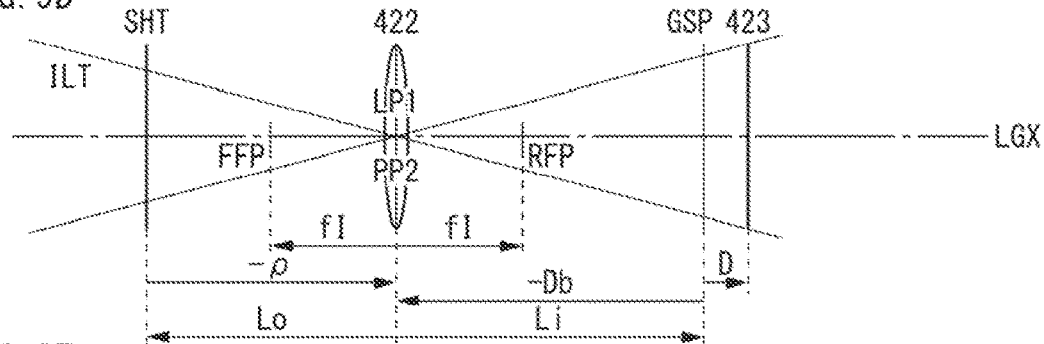
FIG. 9D shows an optical arrangement of the case where the distance Lo+ρ is equal to zero.

FIG. 9D shows an optical arrangement of the case where the distance Lo+ρ from the principal point PP2 of the imaging optical system 422 to the first image point LP1 is equal to zero. In this case, the first image point LP1 is located at the principal point PP2 of the imaging optical system 422, and accordingly both the boiling surfaces are located at infinite distance, i.e., disappear from regions where they are detectable and that are located both anterior and posterior to the imaging optical system 422.

[5] Distance Lo+ρ<0

Figure 9E:
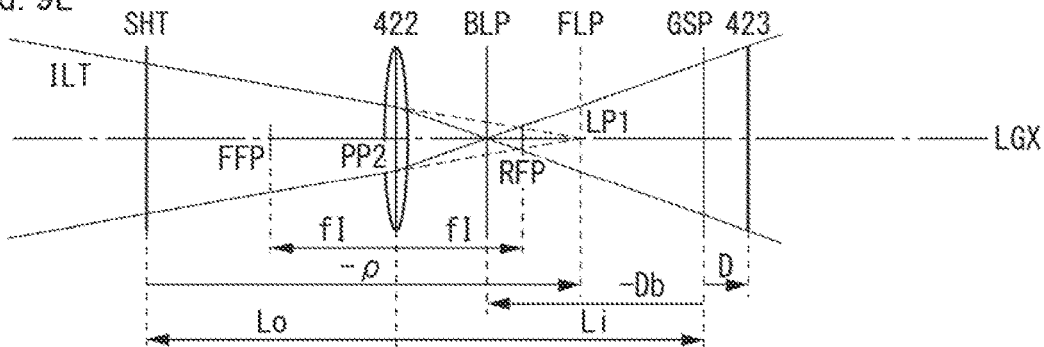
FIG. 9E shows an optical arrangement of the case where the distance Lo+ρ is negative.

FIG. 9E shows an optical arrangement of the case where the distance Lo+ρ from the principal point PP2 of the imaging optical system 422 to the first image point LP1 is negative. In this case, the first image point LP1 is located behind the principal point PP2 of the imaging optical system 422, and accordingly the front boiling surface FLP appears as, not a real image, but a virtual one. From eqs. (4) and (5), the position Db of the rear boiling surface BLP satisfies the following inequality: −Li<Db<−$f_1^2$/(Lo−$f_1$)=−$f_1$·M=−Li+$f_1$. Thus, the rear boiling surface BLP appears between the principal point PP2 and rear focal point RFP of the imaging optical system 422.

—Velocity Ratio Between Sheet and Speckle Pattern—

When the light-receiving surface 423 is separated from the boiling surface BLP, translation of speckle pattern caused by the movement of the sheet is observed. From an observed velocity of speckle pattern, a velocity of the surface of the sheet SHT is measured as follows.

The movement of the surface of the sheet SHT at a velocity $v_S$ causes the movement of speckle at a velocity $V_T$ on a virtual plane SPC at a distance R from the surface of the sheet SHT. Accordingly, the image of the speckle, i.e., speckle pattern, moves at a velocity $-V_1$ on the light-receiving surface 423. This minus sign means that the velocity of speckle is opposite to the velocity of its image. The ratio of the velocity $-V_1$ of speckle pattern to the velocity $V_T$ of speckle is equal to the magnification $M_R$ of the imaging optical system 422, i.e., the ratio in size between an object on the speckle-occurring plane SPC and its image on the light-receiving surface 423: $-V_1/V_T=M_R$. This magnification $M_R$ is equal to the ratio of the distance Li+D of the light-receiving surface 423 to the distance Lo−R of the speckle-occurring plane SPC measured from the principal point PP2 of the imaging optical system 422: $M_R$=(Li+D)/(Lo−R). This magnification $M_R$ and the magnification M of the imaging optical system 422, i.e., the ratio in size between an object on the surface of the sheet SHT and its image on the image plane GSP satisfy the following eq. (6) modified from eq. (4):

$$M = \frac{Li}{Lo} = \frac{Li}{f_1} - 1, \; \frac{1}{M} = \frac{Lo}{Li} = \frac{Lo}{f_1} - 1, \quad (6)$$

$$M_R = \frac{Li+D}{Lo-R} = \frac{Li+D}{f_1} - 1 = M + \frac{D}{f_1},$$

$$\frac{1}{M_R} = \frac{Lo-R}{Li+D} = \frac{Lo-R}{f_1} - 1 = \frac{1}{M} - \frac{R}{f_1}.$$

$$\therefore M_R M = \frac{D}{R}.$$

Similarly, by using the ratio of the distance Li+Db of the second image point LP2 to the distance Lo+ρ of the first image point LP1 measured from the principal point PP2 of the imaging optical system 422, (Li+Db)/(Lo+ρ), the magnification M of the imaging optical system 422, the reflected-wavefront curvature radius −ρ, and the boiling surface position Db satisfy the following eq. (7):

$$\frac{Li+Db}{Lo+\rho} = \frac{Li+Db}{f_1} - 1 = M + \frac{Db}{f_1}, \quad (7)$$

$$\frac{Lo+\rho}{Li+Db} = \frac{Lo+\rho}{f_1} - 1 = \frac{1}{M} + \frac{\rho}{f_1},$$

$$\therefore \left(M + \frac{Db}{f_1}\right)M = \frac{Db}{-\rho}.$$

From eqs. (6) and (7), the following eq. (8) is obtained:

$$\therefore M^2\left(\frac{1}{D} - \frac{1}{Db}\right) = \frac{1}{R} + \frac{1}{\rho}. \quad (8)$$

When a laser beam has its wavefront with a curvature radius ρ at the reflection from the surface of the sheet SHT, the translational velocity $V_T$ of the speckle and the translational velocity $v_S$ of the surface of the sheet SHT satisfy the following eq. (9) based on the space-time correlation function of fluctuations in the intensity of speckle occurring in the plane SPC located at the distance R from the surface of the sheet SHT:

$$\frac{V_T}{v_S} = \frac{R}{\rho} + 1. \quad (9)$$

From eqs. (6), (7), (8), (9), the ratio of the velocity $V_1$ of the speckle pattern on the light-receiving surface 423 to the velocity $v_S$ of the surface of the sheet SHT is expressed by the following eq. (10):

$$\frac{V_I}{v_S} = \frac{V_I}{V_T}\frac{V_T}{v_S} = -M_R\left(\frac{R}{\rho}+1\right) = M\left(\frac{D}{Db}-1\right). \quad (10)$$

—Relation Between Velocity Ratio and Optical Arrangement—

As shown in eq. (10), the velocity ratio $V_1/v_S$ between the sheet and speckle pattern depends on not only the magnification M of the imaging optical system 422, but also the boiling surface position Db, which depends on the reflected-wavefront curvature radius $-\rho$, as shown in eq. (5). This curvature radius $\rho$ is determined from the arrangement of the illumination optical system 412, as shown in eq. (3b). Accordingly, the velocity ratio $V_1/v_S$ is affected, not only through the magnification M by the arrangement of the imaging optical system 422, but also through the curvature radius $\rho$ by the arrangement of the illumination optical system 412.

These influences on the velocity ratio $V_1/v_S$ result from both the optical systems 412, 422 being of a converging type. Indeed, when the illumination optical system is of a collimate type and the imaging optical system is of a telecentric type, the velocity ratio $V_1/v_S$ is affected only by the arrangement of the imaging optical system, but not by the arrangement of the illumination optical system as follows.

Figure 8D:
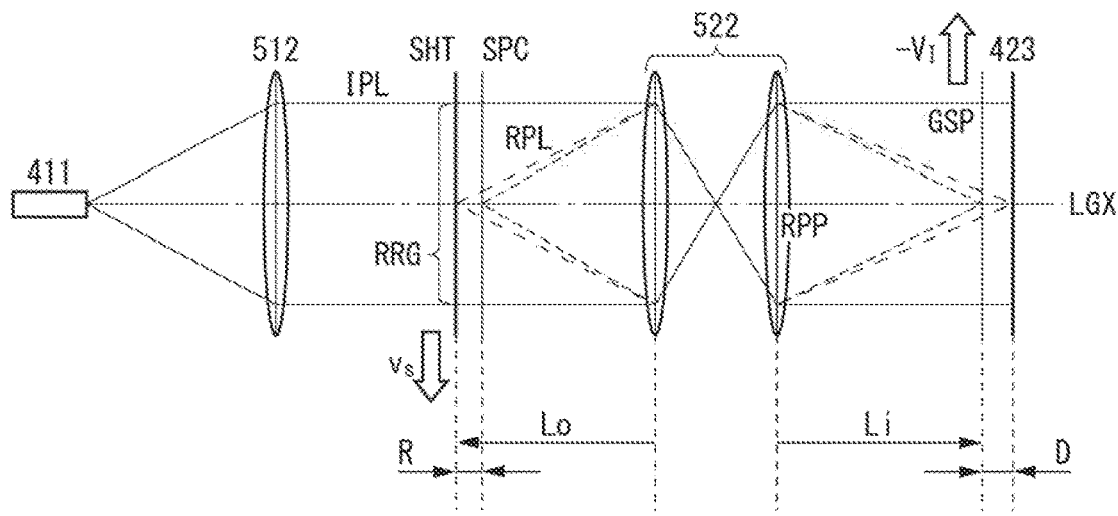
FIG. 8D is an optical arrangement of a displacement sensor including a parallel optical system.

FIG. 8D is an optical arrangement of a displacement sensor including the above-mentioned optical system, which is hereinafter referred to as "parallel optical system." See, e.g., JP 2015-001557, JP 2015-038457. Referring to FIG. 8D, the illumination optical system 512 in this sensor is of a collimate type, and the imaging optical system 522 is of a telecentric type. The illumination optical system 512 converges the laser beam emitted from the light source 411 to a beam IPL parallel to the optical axis LGX, and with it, irradiates the predetermined range RRG in the sheet conveyance path. This parallel beam IPL is reflected by the surface of the sheet SHT passing through the irradiated range RRG. The imaging optical system 522 converges the reflected beam to a parallel beam, and with it, irradiates the light-receiving surface 43 of the image sensor element. In other words, a conjugate point of the light source 411 with respect to any of the illumination optical system 512 and the imaging one 522, i.e., a boiling surface is located at infinite distance. In this case, the magnification of the imaging optical system 522 is independent of the distance Li+D from the rear principal point RPP of the imaging optical system 522 to the light-receiving surface 423 of the image sensor element. Accordingly, the ratio of the velocity $V_1$ of the speckle pattern on the light-receiving surface 423 to the velocity $v_S$ of the surface of the sheet SHT is equal to the limit of the ratio as the boiling surface position Db in eq. (10) goes to infinity, i.e., the ratio is expressed by the following eq. (11):

$$\frac{V_I}{v_S} = \lim_{Db\to\infty} M\left(\frac{D}{Db}-1\right) = -M. \quad (11)$$

As shown in eq. (11), the velocity ratio $V_1/v_S$ between the sheet and speckle pattern depends on only the magnification M of the imaging optical system 522, i.e., the ratio is not affected by the arrangement of the illumination optical system 512. This means that the velocity ratio $V_1/v_S$ can only have a negligible error due to the thermal aberration of the illumination optical system 512. In this respect, the parallel optical system in FIG. 8D has an advantage over the converging one in FIG. 8A.

On the other hand, reduction of an error of the velocity ratio $V_1/v_S$ due to the thermal aberration is easier in the converging optical arrangement than in the parallel one. This is because the converging optical arrangement, in contrast to the parallel one, has the velocity ratio $V_1/v_S$ that depends on the focal point distance $f_1$ of the imaging optical system 422 through, not only the magnification M, but also the distance D from the image plane GSP of the sheet to the light-receiving surface 423 of the image sensor element and the boiling surface position Db. Concretely, when the focal point distance $f_1$ of the imaging optical system 422 has an error $\Delta f$ under the conditions that the distance Lo of the surface of the sheet SHT and the distance Li+D of the light-receiving surface 423 both measured from the principal point PP2 of the imaging optical system 422 are fixed, a resultant error $\Delta(V/v)$ of the velocity ratio $V_1/v_S$ is expressed by the following eq. (12) derived from eqs. (4), (5), and (10):

$$\Delta\left(\frac{V}{v}\right) = \Delta\left\{M\left(\frac{D}{Db}-1\right)\right\} = \Delta M\left(\frac{D}{Db}-1\right) + M\left(\frac{\Delta D}{Db}-\frac{D}{Db^2}\Delta Db\right), \quad (12)$$

$$\Delta M = \Delta\left(\frac{Li}{Lo}\right) = \Delta\left(\frac{f_I}{Lo-f_I}\right) = \frac{Lo}{(Lo-f_I)^2}\Delta f,$$

$$\Delta D = \Delta(Const.-Li) = -Lo\Delta M = -\frac{Lo^2}{(Lo-f_I)^2}\Delta f,$$

$$\frac{\Delta Db}{Db} = \frac{1}{Db}\Delta\left(\frac{-\rho f_I^2}{(Lo-f_I)(Lo-f_I+\rho)}\right) =$$

$$\frac{2Lo(Lo+\rho)-f_I(2Lo+\rho)}{(Lo-f_I)(Lo-f_I+\rho)}\frac{\Delta f}{f_I}, \xrightarrow{D/Db\to 0} \Delta\left(\frac{V}{v}\right) \approx$$

$$-\Delta M + M\frac{\Delta D}{Db} = -\frac{Lo}{(Lo-f_I)^2}\left(1+\frac{MLo}{Db}\right)\Delta f =$$

$$\frac{Lo}{(Lo-f_I)f_I}\left(1+\frac{Lo}{\rho}\right)\Delta f$$

In eq. (12), the following approximation is adopted: the distance Lo from the principal point PP2 of the imaging optical system 422 to the surface of the sheet SHT, the distance Li+D from the principal point PP2 to the light-receiving surface 423 of the image sensor element, the focal point distance $f_1$ of the imaging optical system 422, and the boiling surface position Db are in the same order of magnitude. Relative to these distances, the distance D from the image plane GSP of the sheet to the light-receiving surface 423 of the image sensor element is sufficiently negligible: Lo≈Li+D≈$f_1$≈|Db|>>D. Indeed, the former distances, Lo, Li+D, $f_1$, |Db|, are in the same order of magnitude as the size of a typical optical arrangement, i.e., some millimeters to some dozens of millimeters, and the latter distance D is in the same order of magnitude as the size of typical speckle, i.e., some micrometers.

Figure 10A:
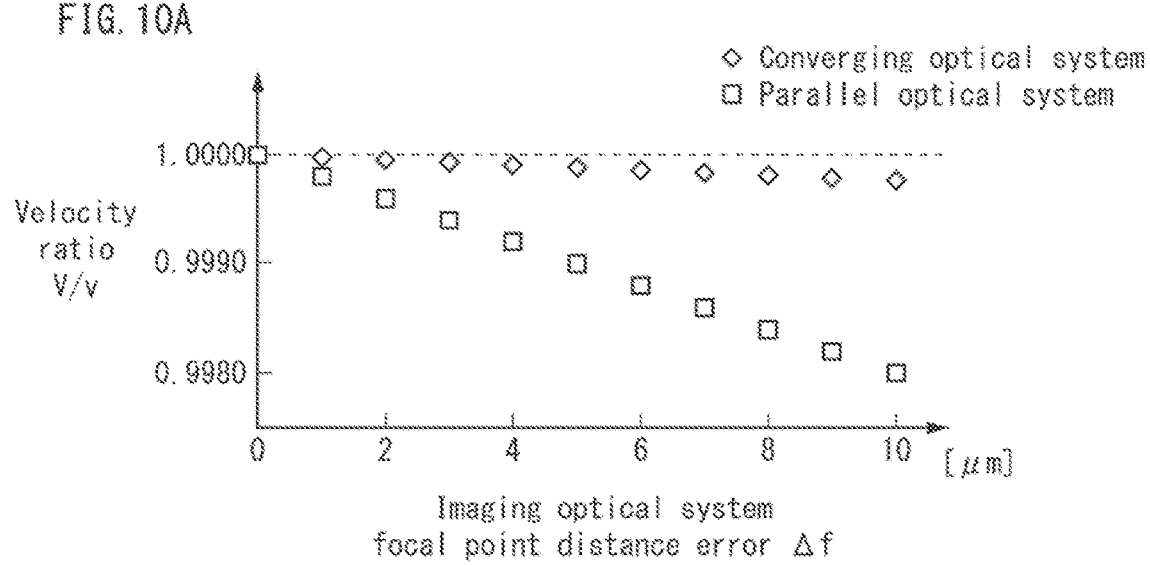
FIG. 10A is a graph showing changes in velocity ratio $V_1/v_s$ due to an error Δf of the focal point distance $f_1$ of the imaging optical system in the optical arrangements in FIGS. 8A and 8D.

FIG. 10A is a graph showing changes in the velocity ratio $V_1/v_S$ due to an error $\Delta f$ of the focal point distance $f_1$ of the imaging optical system in the optical arrangements in FIGS. 8A and 8D. Each rhombus denotes the velocity ratio $(V_1/v_S)_{8a}$ of the converging optical system in FIG. 8A, and each square denotes the velocity ratio $(V_1/v_S)_{8b}$ of the parallel optical system in FIG. 8D. These graphs assume the following case. First, the focal point distances $f_1$ of the imaging optical systems 422, 522 are designed so that the velocity ratio $V_1/v_S$ is a target value of 1.0000. More concretely, each imaging optical system 422, 522, when having the distance Lo of 20 mm from the front principal point PP1, FPP to the surface of the sheet SHT and the distance Li+D of 20 mm from the rear principal point PP2, RPP to the light-receiving surface 423 of the image sensor element, is designed to have the focal point distances $f_1$ of 10 mm. Next, in order to locate the first image point LP1, i.e., the image of the light source 411 focused by the illumination optical system 412, behind the principal point PP2 of the imaging optical system 422, the reflected-wavefront curvature radius $-\rho$ is determined, and more concretely, it is set to 22.5 mm. In this case, the location Db of the boiling surface is set to 18 mm based on eq. (5). Subsequently, each focal point distance $f_1$ actually increases from the designed value by an error $\Delta f$ (>0).

As shown in the slopes of the graphs, change in the velocity ratio $V_1/v_S$ due to the error $\Delta f$ of the focal point distance $f_1$ of the imaging optical system in the converging optical arrangement is reduced to about 1/10 of that in the parallel optical arrangement. This is because of the following reason. In the parallel optical arrangement, change in the velocity ratio $(V_1/v_S)_{8b}$ is determined, according to eq. (11), only from an error $\Delta M$ of the magnification M of the imaging optical system 522. In contrast, in the converging optical arrangement, an error $\Delta M$ of the magnification M of the imaging optical system 422 is cancelled by the ratio $\Delta D/Db$ of an error of the distance D of the light-receiving surface 423 of the image sensor element from the image plane GSP to the boiling surface position Db. The example in FIG. 10A shows that the slope of the velocity ratio $(V_1/v_S)_{8a}$ in the converging optical arrangement is reduced to 1/9 of the slope of the velocity ratio $(V_1/v_S)_{8b}$ in the parallel optical arrangement since the latter slope $-dM/df_1 = -Lo/(Lo-f_1)^2 = -20 \text{ mm}/(20 \text{ mm} - 10 \text{ mm})^2 = -1/5 \text{ [mm}^{-1}\text{]} = -1/500 \text{ [\mu m}^{-1}\text{]}$, because of eq. (11), and the ratio of the former slope to the latter one $|1+M \cdot Lo/Db|=|1-1\cdot 20 \text{ mm}/18 \text{ mm}|=1/9$, because of eq. (12).

The converging optical arrangement thus reduces change in the velocity ratio $V_1/v_S$ due to the error $\Delta f$ of the focal point distance $f_1$ of the imaging optical system more greatly than the parallel optical arrangement. This reduction effect is higher as the factor $1+M \cdot Lo/Db$ in eq. (12) approaches zero, i.e., the distance $Li-(-Db) = M \cdot Lo + Db$ from the principal point PP2 of the imaging optical system 422 to the second image point LP2 or the boiling surface BLP approaches zero. Equivalently, the reduction effect is higher as the factor $1+Lo/\rho$ in eq. (12) approaches zero, i.e., the distance $Lo+\rho$ from the principal point PP2 of the imaging optical system 422 to the first image point LP1 approaches zero. Accordingly, the illumination optical system should be designed to locate the first image point LP1 sufficiently near the principal point PP2 of the imaging optical system 422, so that, even if thermal aberration of the imaging optical system 422 causes an error $\Delta f$ of its focal point distance $f_1$, a following error of the velocity ratio $V_1/v_S$ can be maintained within an acceptable range.

Figure 10B:
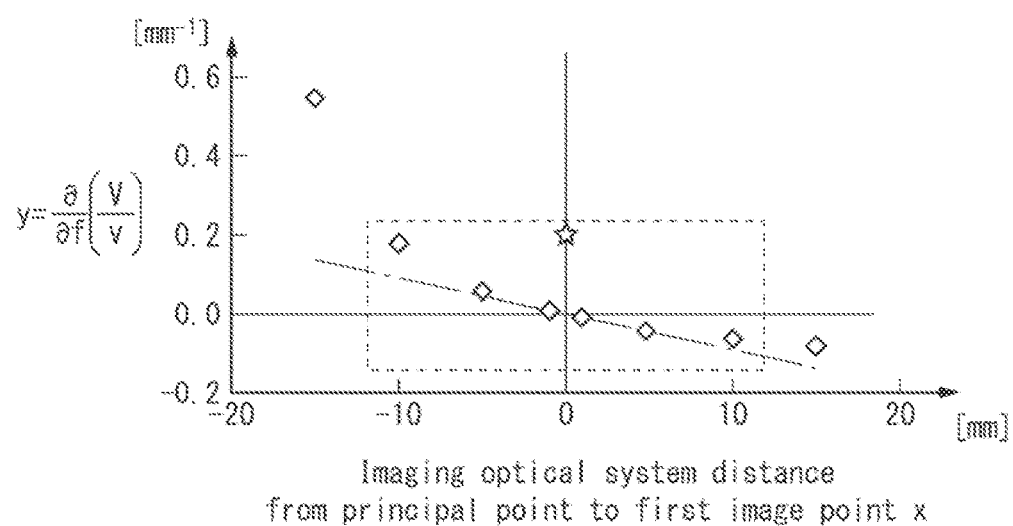
FIG. 10B is a graph showing a relationship between the slopes y of the graphs plotted by the rhombuses in FIG. 10A and the coordinates x of the first image point along the optical axis.
Figure 10C:
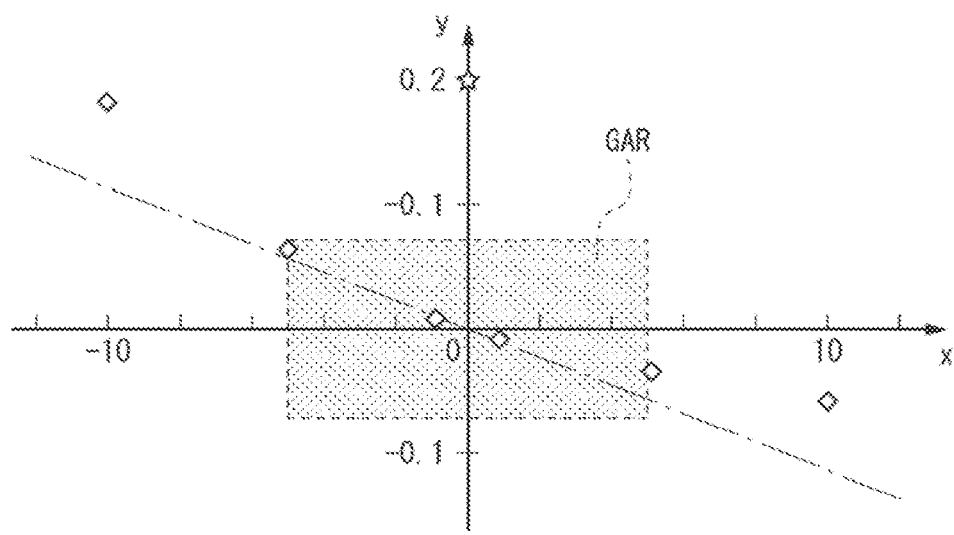
FIG. 10C is an enlarged view of the vicinity of the origin shown by a broken line in FIG. 10B.

FIG. 10B is a graph showing a relationship between the slopes y of the graphs plotted by the rhombuses in FIG. 10A and the coordinates x of the first image point LP1 along the optical axis LGX. FIG. 10C is an enlarged view of the vicinity of the origin shown by a broken line in FIG. 10B. Each coordinate x indicates a distance $-Lo-\rho$ of the first image point LP1 from the origin, x=0, which is assigned to the principal point PP2 of the imaging optical system 422: $x=-Lo-\rho$. Each slope y equals a rate of change in the velocity ratio $V_1/v_S$ with respect to the focal point distance $f_1$ of the imaging optical system 422 when the velocity ratio $V_1/v_S$ is considered as a function of the coordinate x of the first image point LP1 and the focal point distance $f_1$, $V_1/v_S = f(x, f_1)$: $y = \partial(V_1/v_S)/\partial f_1$. Under the approximation that the distance D from the image plane GSP of the sheet to the light-receiving surface 423 of the image sensor element is ignored relative to the size of a space where the imaging optical system 422 is disposed: $Lo \approx Li+D \approx f_1 \approx |Db| \gg D$, the rate y of change in the velocity ratio $V_1/v_S$ is, according to eq. (12), expressed as a function of the coordinate x by the following eq. (13):

$$\frac{\partial}{\partial f_1}\left(\frac{V_1}{v_S}\right) = \frac{Lo}{(Lo-f_1)f_1}\left(1+\frac{Lo}{\rho}\right) = \frac{Lo}{(Lo-f_1)f_1}\left(1-\frac{Lo}{Lo+x}\right). \quad (13)$$

As shown in FIGS. 10B and 10C, the closer to the principal point PP2 of the imaging optical system 422 the first image point LP1 is located, the closer to zero the rate y of change in the velocity ratio $V_1/v_S$ with respect to the focal point distance $f_1$ of the imaging optical system 422 approaches. More concretely, when the first image point LP1 is located within a range GAR that has front and rear ends at a distance not exceeding a half of the focal point distance $f_1$, e.g., 10 mm/2=5 mm, from the principal point PP2, the rate y of change in the velocity ratio $V_1/v_S$ has an absolute value smaller than 0.1 mm$^{-1}$: $|y|<0.1$ mm$^{-1}$. In other words, the magnitude of the velocity ratio $V_1/v_S$ is smaller than 0.1 times the focal point distance $f_1$: $|V_1/v_S|<0.1\ f_1$. Accordingly, an error $\Delta(V/v)$ of the velocity ratio $V_1/v_S$ caused by an error $\Delta f$ of the focal point distance $f_1$ is reduced, at most, below 0.1 times the error $\Delta f$ of the focal point distance $f_1$: $\Delta(V/v)<0.1\ \Delta f$.

Relation Between Location of Light-Source Image and Accuracy of Velocity-Ratio Expression As long as an error of the velocity ratio $V_1/v_S$ due to thermal aberration of the imaging optical system 422 is calculated from eq. (12), the converging optical arrangement has the smaller error of the velocity ratio $V_1/v_S$ when the first image point LP1, i.e., the image of the light source 411 focused by the illumination optical system 421 is closer to the principal point PP2 of the imaging optical system 422. However, the case where the first image point LP1 is located at the principal point PP2, $x=Lo+\rho=0$, is an exception; in this case, the expression of the velocity ratio $V_1/v_S$, eq. (10), has a reduced accuracy.

Indeed, in this exceptional case, boiling surfaces disappear from the regions located both anterior and posterior to the imaging optical system 422, as described about the case [4]. Such disappearance of boiling surfaces is similar to appearance of the boiling surface at infinite distance in the parallel optical arrangement in FIG. 8D. See, e.g., reference 1. In this parallel optical arrangement, the rate y of change in the velocity ratio $V_1/v_S$ with respect to the focal point distance $f_1$ of the imaging optical system 522 is a constant value independent of the coordinate x, $-dM/df_1 = -Lo/(Lo-f_1)^2$, which is $-1/5=0.2$ [mm$^{-1}$] in the example in FIG. 10A and marked by a star STR in FIGS. 10B and 10C. This star STR is obviously deviated from the graph consisting of the rhombuses. This seems to indicate discontinuity of the velocity ratio $V_1/v_S$ at the origin, x=0, and thus, the expression of the velocity ratio $V_1/v_S$, eq. (10), is unreliable, at least, at the origin, x=0.

Displacement of Light-Source Image Resulting from Thermal Aberration of Illumination Optics Because of thermal aberration of the illumination optical system 412, temperature fluctuations shift the first image point LP1 along the optical axis LGX. If a shift range of the first image point LP1 is located within the range GAR in FIGS. 10B and 10C, an error of the velocity ratio $V_1/v_S$ remains within an acceptable range.

In order to locate the shift range of the first image point LP1 caused by temperature fluctuations of the illumination optical system 412 anterior to or posterior to the principal point PP2 of the imaging optical system 422, the following conditions should be satisfied. In the case where the temperature of the illumination optical system 412 is equal to a reference value of, e.g., 30 degrees Celsius (degC.), the distance between the first image point LP1 and the principal point PP2 of the imaging optical system 422 must be longer than the difference in location of the first image point LP1 between before and after a change in temperature of the illumination optical system 412 from the reference value of 30 degC.

FIGS. 11A and 11B are schematic views showing that a shift range DPR of the first image point caused by temperature fluctuations of the illumination optical system 412 is located anterior to and posterior to the principal point PP2 of the imaging optical system 422, respectively. From the principal point PP2, the farther end FSE of the shift range DPR, which is hereinafter referred to as "far end," indicates the location of the first image point LP1 when the temperature of the illumination optical system 412 equals the lower limit of its use temperature range, e.g., 0 degC.; the nearer end NSE of the shift range DPR, which is hereinafter referred to as "near end," indicates the location of the first image point LP1 when the temperature of the illumination optical system 412 equals the upper limit T1 of its use temperature range, e.g., 60 degC. FIGS. 11A and 11B also show the location of the first image point LP1 when the temperature of the illumination optical system 412 equals the reference value T0=30 degC. Referring to FIGS. 11A and 11B, the location of the shift range DPR is separated anterior to or posterior to the principal point PP2. Even if the temperature of the imaging optical system 422 rises to its upper limit T1, the first image point LP1 does not reach the principal point PP2.

More concretely, the distance D0 of the first image point LP1 from the principal point PP2 of the imaging optical system 422 when the temperature T of the illumination optical system 412 equals the reference value T0 is longer than the absolute value |b1−b0| of a difference of two values, b0 and b1. One of these values, b0, is a value that the distance b of the first image point LP1 from the principal point PP1 of the illumination optical system 412 (cf. FIG. 8A) has when the temperature T equals the reference value T0; and the other, b1, is a value that the distance b has when the temperature T equals its upper limit T1. These values b0, b1 of the distance b are expressed by the following eq. (14) under the "thin-lens" approximation with two pairs of values, (a0, f0) and (a1, f1). One of these pairs, (a0, f0), is a pair of values that the distance a of the light source 411 from the principal point PP1 of the illumination optical system 412 (cf. FIG. 8A) and the (rear) focal point distance of the illumination optical system 412 have when the temperature T equals the reference value T0; and the other, (a1, f1), is a pair of values that the distance a of the light source 411 and the focal point distance of the illumination optical system 412 have when the temperature T equals its upper limit T1:

$$D0 > |b1 - b0|, \frac{1}{b0} = \frac{1}{f0} - \frac{1}{a0}, \frac{1}{b1} = \frac{1}{f1} - \frac{1}{a1}. \quad (14)$$

—Thermal Change in Distance of Light Source from Principal Point of Illumination Optics—

The values a0 and a1 of the distance a of the light source 411 from the principal point PP1 of the illumination optical system 412 are calculated as follows. The former value a0 of the distance a when the temperature T of the illumination optical system 412 equals the reference value T0 is a design value of the illumination optical system 412. The latter value a1 of the distance a at the temperature T of its upper limit T1 is larger than the design value a0 by a value that is the rate of thermal change in the distance a, da/dT, integrated from the reference value T0 to the upper limit T1. The rate of change in the distance a when the temperature T changes by a tiny level ΔT, Δa/a, is estimated by the product of the linear expansion coefficient β of the ball frame 413 and the change level ΔT in the temperature T, as shown in the following eq. (15):

$$\frac{\Delta a}{a} = \beta \Delta T. \quad (15)$$

—Thermal Change in Focal Point Distance of Illumination Optics—

The values f0 and f1 of the (rear) focal point distance of the illumination optical system 412 are calculated as follows. The former value f0 of the focal point distance when the temperature T of the illumination optical system 412 equals the reference value T0 is a design value of the illumination optical system 412. The latter value f1 of the focal point distance when the temperature T equals its upper limit T1 is larger than the design value f0 by a value that is the rate of thermal change in the focal point distance f, df/dT, integrated from the reference value T0 to the upper limit T1.

The temperature dependency of the focal point distance f of the illumination optical system 412 is calculated as follows. First, when the illumination optical system 412 is expressed as a single convex lens, its focal point distance f is expressed by the following eq. (16) with its front curvature radius r1, rear curvature radius r2 (<0), and refractive index n:

$$\frac{1}{f} = (n-1)\left(\frac{1}{r1} - \frac{1}{r2}\right). \quad (16)$$

In general, the refractive index n of the lens is a function of the wavelength λ of a transmitted light beam and the temperature T of the lens: n=n(λ, T). The curvature radius r of the lens is a function of its temperature T, since fluctuations in the temperature entails thermal extension of glass material to change the curvature radius r. Accordingly, derivative of both sides of eq. (16) with respect to the temperature T satisfy the following eq. (17):

$$-\frac{1}{f^2}\frac{df}{dT} = \frac{dn}{dT}\left(\frac{1}{r1} - \frac{1}{r2}\right) + (n-1)\left(-\frac{1}{r1^2}\frac{dr1}{dT} + \frac{1}{r2^2}\frac{dr2}{dT}\right), \quad (17)$$

$$\therefore -\frac{1}{f}\frac{df}{dT} = \frac{1}{n-1}\frac{dn}{dT} + \frac{r1r2}{r2-r1}\left(-\frac{1}{r1^2}\frac{dr1}{dT} + \frac{1}{r2^2}\frac{dr2}{dT}\right).$$

Since the light source 411 is a semiconductor laser, the wavelength λ of its emitted light beam usually shows temperature dependency, dλ/dT, characteristic of the semiconductor laser. Accordingly, derivative of the refractive index n of the illumination optical system 412 with respect to the temperature T, dn/dT, is expressed by the following eq. (18):

$$\frac{dn}{dT} = \frac{\partial n}{\partial \lambda}\frac{d\lambda}{dT} + \frac{\partial n}{\partial T}. \quad (18)$$

Derivative of the curvature radius ri (i=1, 2.) of the illumination optical system 412 with respect to the temperature T, dri/dT, is equal to the product of the linear expansion coefficient α of glass material of the illumination optical system 412 and the curvature radius ri, as shown in eq. (19):

$$\frac{dri}{dT} = \alpha \cdot ri. \quad (19)$$

Substitution of eqs. (18), (19) into eq. (17) leads the following differential equation (20):

$$-\frac{1}{f}\frac{df}{dT} = \frac{1}{n-1}\left(\frac{\partial n}{\partial \lambda}\frac{d\lambda}{dT} + \frac{\partial n}{\partial T}\right) - \alpha. \quad (20)$$

Thus, the rate of change in the focal point distance f of the illumination optical system 412, Δf/f, caused by its temperature change T→T+ΔT, is estimated by the following eq. (21):

$$-\frac{\Delta f}{f} = \left(\omega \frac{d\lambda}{dT} + \psi\right)\Delta T, \omega = \frac{1}{n-1}\frac{\partial n}{\partial \lambda}, \psi = \frac{1}{n-1}\frac{\partial n}{\partial T} - \alpha. \quad (21)$$

The factor ω in the first term of the right-hand side of eq. (21) is called "dispersion rate" of the illumination optical system 412, and the factor ψ in the second term is called "thermal dispersion rate" of the illumination optical system 412; see reference 3.

From (15), the distance a1 of the light source 411 from the principal point PP1 of the illumination optical system 412 at the temperature T of the upper limit T1=60 degC. is derived. From (21), the focal point distance f1 of the illumination optical system 412 at the same temperature T=T1 is derived. Substitution of these derived values into eq. (14) provides the distance b1 of the first image point LP1 from the principal point PP1 at the same temperature T=T1. The distance b0 of the first image point LP1 at the temperature T of the reference value T0 is predetermined as a design value of the illumination optical system 412. Both the optical systems 412, 422 are designed under the condition that the difference between these distances b1 and b0, |b1−b0|, be exceeded by the distance D0 of the first image point LP1 from the principal point PP2 of the imaging optical system 422 when the temperature T of the illumination optical system 422 equals the reference value T0. Thus, the location of the near end NSE of the shift range DPR is determined.

Similarly, a distance a of the light source 411 from the principal point PP1 of the illumination optical system 412, its focal point distance f, and a distance b of the first image point LP1 from the principal point PP1 are calculated when the illumination optical system 412 is at the temperature of the lower limit of its use range=0 degC. From this distance b of the first image point LP1, another distance of the first image point LP1 from the principal point PP2 of the imaging optical system 422 is calculated. Both the optical systems 412, 422 are designed under the condition that the resultant distance of the first image point LP1 be shorter than a half of the focal point distance $f_1$ of the imaging optical system 422. Thus, the location of the far end FSE of the shift range DPR is determined within the range GAR shown in FIG. 10C. Accordingly, an error Δ(V/v) of the velocity ratio $V_1/v_S$ caused by an error Δf of the focal point distance $f_1$ is reduced to less than 0.1 times the error Δf of the focal point distance $f_1$.

—Example of Design Values for First Image Point Anterior to Imaging Optics—

As shown in FIG. 11A, when the shift range DPR of the first image point LP1 is located anterior to the principal point PP2 of the imaging optical system 422, parameters have design values listed below, under the conditions that the displacement sensor 400 has its use temperature range from 0 degC. to 60 degC. and the reference value of its use temperature T0=30 degC.

Light source 411: the laser-beam wavelength λ=780 nm; temperature dependency dλ/dT=0.23 nm/degC.

Illumination optical system 412: the linear extension coefficient of glass material, L-BSL7, α=58*10$^{-7}$ degC.$^{-1}$; the refractive index n=1.51; wavelength dependency ∂n/∂λ=−2.11*10$^{-5}$ nm$^{-1}$; temperature dependency ∂n/∂T=−4.4*10$^{-6}$ degC.$^{-1}$; the focal point distance f0=20.7 mm; the distance of the light source 411 from the principal point PP1, a0=25.1 mm; the distance of the first image point LP1 from the principal point PP2 of the imaging optical system 422, b0=1.92 mm; the reflected-wavefront curvature radius −ρ=18.08 mm.

Ball frame 413: material=Al; linear extension coefficient β=−2.36*10$^{-5}$ degC.$^{-1}$.

Imaging optical system 422: the focal point distance $f_1$=10 mm; the magnification M=1; the distance of the surface of the sheet SHT from the principal point PP2, Lo=20 mm; the location of the boiling surface, Db=−22.37 mm.

For speckle occurring within a range where a distance R from the surface of the sheet SHT is negligible relative to the distance Lo of the sheet surface from the principal point PP2 of the imaging optical system 422, i.e., R<<Lo=20 mm, the distance ID of observed speckle pattern from the image plane GSP of the sheet can be ignored relative to the location Db of the boiling surface: D<<−Db. Accordingly, "the velocity ratio $V_1/v_S$=−1" is acceptable, i.e., any deviation of the ratio from the number "−1" is within the margin of error.

The focal point distance 10 of the illumination optical system 412 has an error |Δf|=0.0042 mm due to temperature fluctuations in the use temperature range from 0 degC. to 60 degC. The distance a0 of the light source 411 from the principal point PP1 of the illumination optical system 412 has an error |Δa|=0.0147 mm. The distance b0 of the first image point LP1 from the principal point PP2 of the imaging optical system 422 has an error |Δb|=0.154 mm. Accordingly, the shift range DPR of the first image point LP1 has the far end FSE and the near end NSE located at the distance of −2.07 mm and −1.76 mm, respectively, from the principal point PP2 of the imaging optical system 422. These minus signs mean their locations are anterior to the principal point PP2. Since the first image point LP1 is maintained within this shift range DPR, the relative error $(v_S/V_1)\Delta(V/v)$ of the velocity ratio $V_1/v_S$ is reduced to a level from 0.010% through 0.012% even if the relative error $\Delta f/f_1$ of the focal point distance $f_1$ of the imaging optical system 422 caused by its temperature aberration is 0.05%, for example.

—Example of Design Values for First Image Point Posterior to Imaging Optics—

As shown in FIG. 11B, when the shift range DPR of the first image point LP1 is located posterior to the principal point PP2 of the imaging optical system 422, parameters have design values listed below, under the conditions that the displacement sensor 400 has its use temperature range from 0 degC. to 60 degC. and the reference value of its use temperature T0=30 degC.

Light source 411: the same as the above-listed values.

Illumination optical system 412: for glass material, the same as the above-listed values; the focal point distance f0=20.7 mm; the distance of the light source 411 from the principal point PP1, a0=24.9 mm; the distance of the first image point LP1 from the principal point PP2 of the imaging optical system 422, b0=2.72 mm; the reflected-wavefront curvature radius −ρ=22.72 mm.

Ball frame 413: the same as the above-listed values.

Imaging optical system 422: the focal point distance $f_1$=10 mm; the magnification M=1; the distance of the surface of the sheet SHT from the principal point PP2, Lo=20 mm; the location of the boiling surface, Db=−17.86 mm.

For speckle occurring within a range where a distance R from the surface of the sheet SHT is negligible relative to the distance Lo of the sheet surface from the principal point PP2 of the imaging optical system 422, i.e., R<<Lo=20 mm, the distance D of speckle pattern from the image plane GSP of the sheet can be ignored relative to the location Db of the boiling surface: D<<−Db. Accordingly, "the velocity ratio $V_1/v_S$=−1" is acceptable, i.e., any deviation of the ratio from the number "−1" is within the margin of error.

The focal point distance f0 of the illumination optical system 412, the distance a0 of the light source 411 from the principal point PP1 of the illumination optical system 412, and the distance b0 of the first image point LP1 from the principal point PP2 of the imaging optical system 422 have the same errors due to temperature fluctuations in the use temperature range from 0 degC. to 60 degC. as the above-listed errors. Accordingly, the shift range DPR of the first image point LP1 has the near end NSE and the far end FSE located at the distance of +2.57 mm and +2.88 mm, respectively, from the principal point PP2 of the imaging optical system 422. These plus signs mean their locations posterior to the principal point PP2. Since the first image point LP1 is maintained within this shift range DPR, the relative error $(v_S/V_1)\Delta(V/v)$ of the velocity ratio $V_1/v_S$ is reduced to a level of 0.011% through 0.013% with respect to the relative error $\Delta f/f_1 \approx 0.05\%$ of the focal point distance $f_1$ of the imaging optical system 422 caused by its temperature aberration.

Merit of Embodiment

In the displacement sensor 400 according to the above-described embodiment of the invention, the illumination optical system 412 converts the laser beam emitted from the light source 411 into the converging beam ILT, and with it, irradiates the predetermined range RRG in the sheet conveyance path. When a sheet SHT passes through the range RRG, the imaging optical system 422 converges the beam ILT reflected by the surface of the sheet SHT into a converging beam, and with it, irradiates the light-receiving surface 423 of the image sensor element 421. Temperature fluctuations of the illumination optical system 412 causes the image LP1 of the light source focused by the illumination optical system 412 to shift along the optical axis LGX of the imaging optical system 422. The shift range DPR is within the vicinity of the principal point PP2 of the imaging optical system 422, and preferably, within a region that has front and rear ends at a distance not exceeding a half of the focal point distance $f_1$ from the principal point PP2. In this case, the rate of change in the velocity ratio $V_1/v_S$ with respect to the focal point distance $f_1$, $\partial(V_1/v_S)/\partial f_1$, has an absolute value smaller than 0.1 mm$^{-1}$, and accordingly, a relative error of the velocity ratio $V_1/v_S$ caused by temperature aberration of the imaging optical system 422 is reduced to a level in the order of 0.01%. In addition, the shift range DPR is located anterior to or posterior to the principal point PP2 of the imaging optical system 422, and in particular, its near end NSE is disposed at a sufficient distance from the principal point PP2, and thus, eq. (13) expressing the velocity ratio $V_1/v_S$ maintains a sufficiently high accuracy. As described above, this displacement sensor 400 has both the illumination and imaging optical systems 412, 422 constructed as a converging type, and regardless of temperature aberration of the optical systems, enables the velocity ratio $V_1/v_S$ to have a reduced error.

Modification (A) The image forming device 100 in FIG. 1A is a MFP. Alternatively, an image forming device according to an embodiment of the invention may be any single-function device, e.g., a laser printer, an inkjet printer, a copier, or a fax machine.

(B) The MFP 100 uses the displacement sensor 400 as the feeder sensor 1FS, 2FS, the timing sensor TS, or the ejection sensor ES. The displacement sensor 400 may be used in control for conveyance of sheets as another paper sensor CS. A target of the displacement sensor 400, not being limited to a sheet, may be a rotatable image carrier such as the photoreceptor drum 25Y-25K or the intermediate transfer belt 23. More specifically, the displacement sensor 400 may be used to monitor a rotation number of the image carrier, which may be used in control for rotation of the image carrier or image stabilization. The displacement sensor 400 further may be used not only in an image forming device such as the MFP 100, but also in a generic device equipped with mechanism of conveyance of sheets such as an ADF, scanner, or finisher, for determination of a displacement of a movable member such as a sheet or conveyance roller.

(C) The displacement calculation unit 433 uses eq. (1) to calculate coefficients of correlation between brightness distributions in two images, and from a deviation of peaks of the distributions, determines a displacement of a sheet. Alternatively, the displacement calculation unit 433 may use other image recognition technologies such as the combination of edge detection, histogram of oriented gradients (HOG), and support vector machine (SVM), to retrieve portions CHP of two images sharing a common feature of speckle pattern (cf. FIG. 7B), and from a shift amount ε of the portions CHP within the images, may calculate a displacement of a sheet.

FIG. 8A illustrates each of the illumination and imaging optical systems 412, 422 as a single convex lens. Each of the optical systems 412, 422 may actually be a single convex lens as shown in this figure, or alternatively, one or both of them may be a compound lens system consisting of plural lenses. When the imaging optical system 422 is a compound lens, it has two separated principal points, front and rear ones. In this case, the shift range DPR of the first image point LP1 should be located anterior to the front principal point or posterior to the rear principal point.

The imaging optical system 422 is designed to have the magnification M of "1." Alternatively, this magnification M may be designed to be higher than "1." This leads to measurement of the velocity $v_S$ of speckle pattern with a higher precision, and thus enables a displacement of a sheet to be detected with a higher accuracy.

The displacement sensor 400 according to the above-described embodiment ensures that an error of the velocity ratio $V_1/v_S$ is within an acceptable range. Accordingly, the displacement calculation unit 433 calculates a displacement of a sheet under the assumption that the velocity ratio $V_1/v_S$ always equals its design value of "−1." Alternatively, depending on an actual temperature of the illumination optical system 412, the displacement sensor may correct the velocity ratio $V_1/v_S$ to be used in calculation of a displacement from its design value.

Figure 12A:
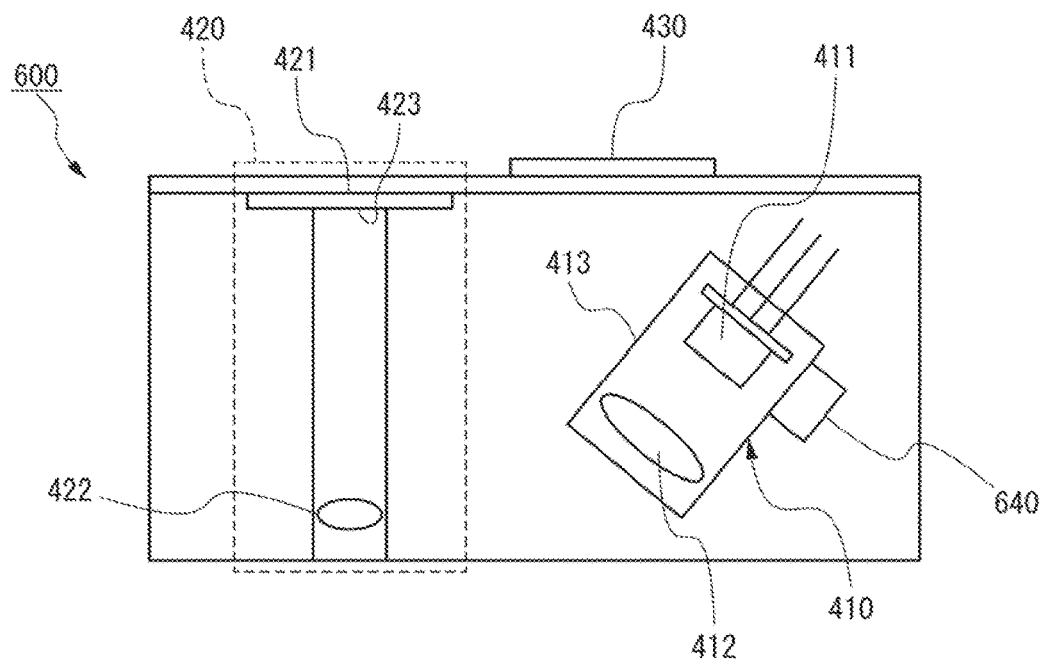
FIG. 12A is a cross-section view schematically illustrating a displacement sensor according to a modification of the embodiment of the invention.

FIG. 12A is a cross-section view schematically illustrating a displacement sensor 600 according to a modification of the embodiment of the invention. This modified structure differs from the original structure of the displacement sensor 400 only in the emission unit 410 equipped with a temperature sensor 640, which includes a thermistor for touching an outer surface of the ball frame 413 to change its electric resistance depending to the temperature of the ball frame 413.

Figure 12B:
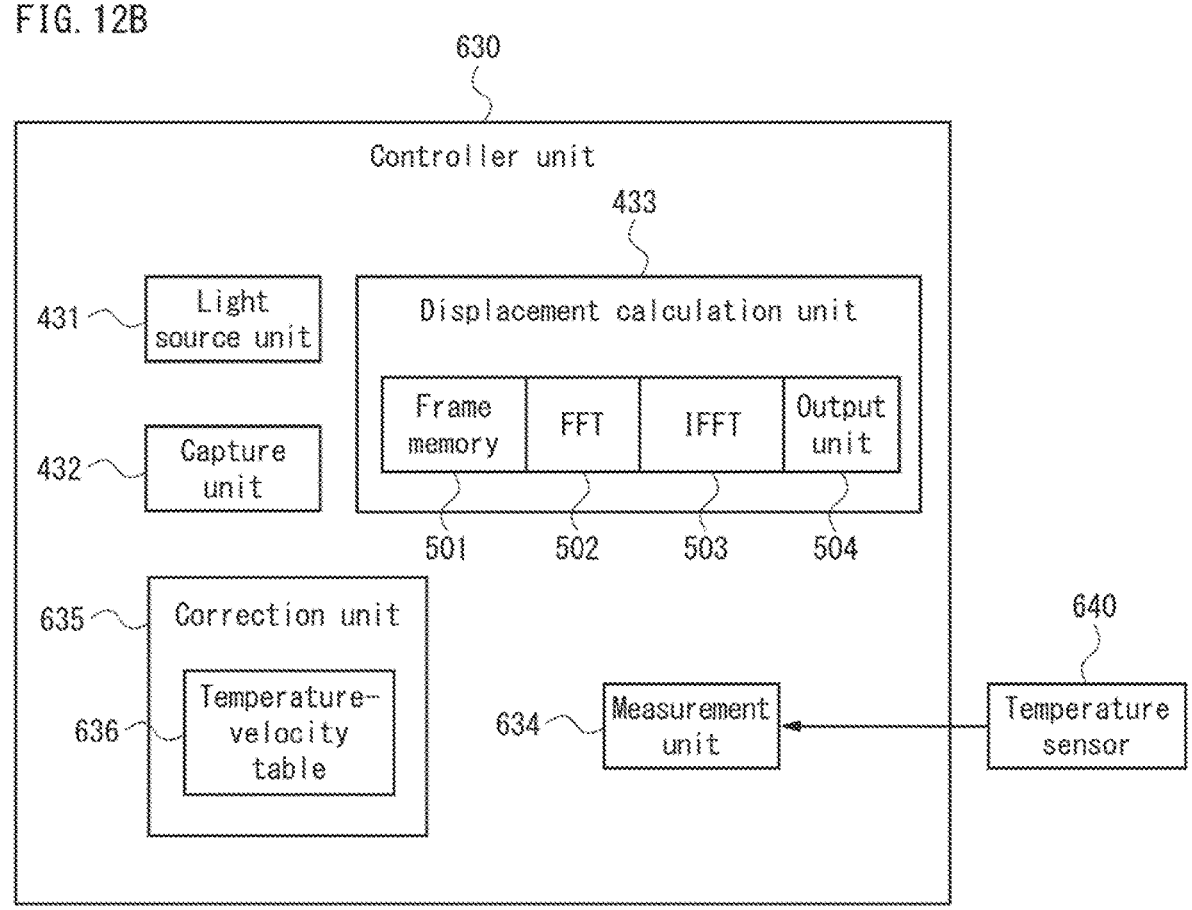
FIG. 12B is a functional block diagram of a controller unit of this displacement sensor.

FIG. 12B is a functional block diagram of a controller unit 630 built in this displacement sensor 600. This controller unit 630 includes, in addition to the elements of the control unit 430 in FIG. 5B, a measurement unit 634 and a correction unit 635. The measurement unit 634 monitors an electric resistance of the temperature sensor 640, and from a change in the electric resistance, measures the temperature of the ball frame 413. The correction unit 635 stores a temperature-velocity table 636 in a built-in memory. This table 636 specifies, for a different measured value of the temperature of the ball frame 413, a deviation of the velocity ratio $V_1/v_S$ from a design value. Each time receiving a measured temperature from the measurement unit 634, the correction unit 635 retrieves an error of the velocity ratio corresponding to the measured temperature from the temperature/velocity table 636, and informs the displacement calculation unit 433 of the retrieved error. In response to the information, the displacement calculation unit 433 updates a velocity ratio to be used in calculation of displacement with the sum of the original ratio plus the error.

Errors of the velocity ratio $V_1/v_S$ specified by the temperature/velocity ratio table 636 are calculated, for example, by an experiment or simulation at the manufacture of the displacement sensor 600 as follows. First, the distance a of the light source 411 from the principal point PP1 of the illumination optical system 412 at its temperature equal to a measured value is calculated by eq. (15), and the focal point distance f of the illumination optical system 412 at the same temperature is calculated by eq. (21). Substitution of the results of these calculations to eq. (14) derives the distance b of the first image point LP1 from the principal point PP1 of the illumination optical system 412 at the same temperature. The difference between this distance b and its design value b0 represents a shift amount of the first image point LP1, which is equal to a change amount of the reflected-wavefront curvature radius −ρ. Depending on this change amount, the location Db of the boiling surface changes according to eq. (5). As a result, the velocity ratio $V_1/v_S$ changes according to eq. (10). This change amount is determined as an error of the velocity ratio $V_1/v_S$, and recorded in the table 636.

In the above-described manner, the velocity ratio $V_1/v_S$ to be used in calculation of displacement is corrected from a design value, depending on the real temperature of the illumination optical system 412. Thus, the range DPR within which the first image point LP1 can shift due to temperature aberration of the illumination optical system 412 may be located at a distance exceeding a half of the focal point distance $f_1$ of the imaging optical system 422 from its principal point PP2. In this case, the corrected velocity ratio $V_1/v_S$ also has an error $\Delta(V/v)$ reduced below the upper boundary of an acceptable range.

Supplement

Based on the above-described embodiment, the invention may be further characterized as follows.

The illumination optical system focuses the laser light from the emission unit into a first image of the emission unit. The limitation of location of the range within which the first image of the emission unit is displaced by a temperature change of the illumination optical system may be equivalent to a condition that the distance between the first image of the emission unit and the front or rear principal point of the imaging optical system when the temperature of the illumination optical system equals a reference value is longer than a difference in location of the image of the emission unit between before and after a change of temperature of the illumination optical system from the reference value.

The above-mentioned limitation of location of the range of displacement may also be equivalent to the following expressions:

$$D0 > |b1 - b0|, \frac{1}{b0} = \frac{1}{f0} - \frac{1}{a0}, \text{ and } \frac{1}{b1} = \frac{1}{f1} - \frac{1}{a1},$$

in which the letters D0, a0, and f0 denote (a) the distance between the first image of the emission unit and the front or rear principal point of the imaging optical system, (b) the distance between the emission unit and the front principal point of the illumination optical system, and (c) the rear focal point distance of the illumination optical system, respectively, when the temperature of the illumination optical system equals the reference value T0; and the letters a1 and f1 denote (d) the distance between the emission unit and the front principal point of the illumination optical system, and (e) the rear focal point distance of the illumination optical system, respectively, when the temperature of the illumination optical system equals a value T1 after a change from the reference value T0.

The rate of change $\Delta f/f$ of the rear focal point distance f of the illumination optical system due to a change $\Delta T$ in the temperature T of the illumination optical system may be evaluated by the following equations:

$$-\frac{\Delta f}{f} = \left(\omega \frac{d\lambda}{dT} + \psi\right)\Delta T, \omega = \frac{1}{n-1}\frac{\partial n}{\partial \lambda}, \text{ and } \psi = \frac{1}{n-1}\frac{\partial n}{\partial T} - \alpha,$$

in which the letters n, ω, and ψ denote the refractive index, dispersive power, and thermal dispersive power of the illumination optical system, respectively, the letter α denotes the linear expansion coefficient of glass material for the illumination optical system, and the letters dλ/dT denote the dependence of the wavelength λ of laser light ejected from the emission unit on the temperature of the emission unit.

The rate of change Δa/a of the distance a between the emission unit and the front principal point of the illumination optical system due to the change ΔT of the temperature T of the illumination optical system may be evaluated by the product of the linear expansion coefficient β of a member and the change ΔT in the temperature of the illumination optical system: Δa/a=β·ΔT. The member may maintain the gap between the emission unit and the illumination optical system at a fixed distance.

The calculation unit may evaluate the ratio of a velocity V of speckle pattern with respect to a velocity v of the target by the following equation:

$$\frac{V}{v} = M\left(\frac{D}{Db} - 1,\right)$$

in which uses the letters M, D, and Db denote (a) the magnification of the imaging optical system, (b) the distance between the light-receiving surface of the detection unit and the imaging surface of the imaging optical system, and (c) the distance between a second image of the emission unit into which the imaging optical system focuses the light reflected from the target and the imaging surface of the imaging optical system, respectively.

The distance between the first image of the emission unit and the front or rear principal point of the imaging optical system may be shorter than the distance where an error of the velocity ratio V/v between speckle pattern caused by a displacement of the first image of the emission unit along the optical axis of the imaging optical system and the target reaches a boundary of an acceptable range. This boundary of the acceptable range may be no more than half of the front or rear focal point distance of the imaging optical system. The magnification of the imaging optical system may be no less than one.

The displacement sensor may further include: a measurement unit configured to measure temperatures of the emission unit and the illumination optical system; and a correction unit configured to calculate from values measured by the measurement unit an error of a shift ratio between speckle pattern caused by a displacement of the first image of the emission unit and the target, and based on the error, correct a displacement of the target calculated by the calculation unit.

What is claimed is:

1. A displacement sensor for detecting a displacement of a target, which is a movable member mounted in a device equipped with the displacement sensor or an object carried by the device, the displacement sensor comprising:
an emission unit configured to emit laser light;
an illumination optical system configured to convert the laser light into first converging light, and irradiate with the first converging light a detection space through which the target moves;
an imaging optical system configured to convert light reflected from the target into second converging light, the imaging optical system having an optical axis along which a first image of the emission unit into which the illumination optical system focuses the laser light from the emission unit is displaced by a temperature change of the illumination optical system within a range of displacement that is limited to be located either anterior to a front principal point of the imaging optical system, or posterior to a rear principal point of the imaging optical system, by factors that include (a) distance between the emission unit and the front principal point of the illumination optical system, (b) a rear focal point distance of the illumination optical system, (c) amounts of respective changes of the distance and the rear focal point distance caused by a temperature change of the illumination optical system, and (d) location of the front principal point of the imaging optical system relative to the illumination optical system;
a detection unit having a light-receiving surface to be irradiated by the second converging light, the detection unit configured to detect a distribution of amounts of the second converging light on the light-receiving surface; and
a calculation unit configured to make the emission unit repeatedly emit the laser light and make the detection unit repeatedly detect the distribution of amounts of the second converging light while the target crosses the detection space, and based on a shift of speckle pattern indicated by a difference between the distributions of amounts of the second converging light detected at different times, calculate a displacement of the target,
wherein the location of the range of displacement is further limited to a condition that the distance between the first image of the emission unit and the front or rear principal point of the imaging optical system when the temperature of the illumination optical system equals a reference value is longer than a difference in location of the first image of the emission unit between before and after a change of temperature of the illumination optical system from the reference value.

2. The displacement sensor according to claim 1 wherein the limitation of location of the range of displacement is equivalent to the following expressions:

$$D0 > |b1 - b0|, \; \frac{1}{b0} = \frac{1}{f0} - \frac{1}{a0}, \text{ and } \frac{1}{b1} = \frac{1}{f1} - \frac{1}{a1},$$

in which:
the letters D0, a0, and f0 denote (a) the distance between the first image of the emission unit and the front or rear principal point of the imaging optical system, (b) the distance between the emission unit and the front principal point of the illumination optical system, and (c) the rear focal point distance of the illumination optical system, respectively, when the temperature of the illumination optical system equals the reference value T0; and
the letters a1 and f1 denote (d) the distance between the emission unit and the front principal point of the illumination optical system, and (e) the rear focal point distance of the illumination optical system, respectively, when the temperature of the illumination optical system equals a value T1 after a change from the reference value T0.

3. The displacement sensor according to claim 1 further comprising:
a measurement unit configured to measure temperatures of the emission unit and the illumination optical system; and
a correction unit configured to calculate from values measured by the measurement unit an error of a shift ratio between speckle pattern caused by a displacement of the first image of the emission unit and the target, and based on the error, correct a displacement of the target calculated by the calculation unit.

4. A displacement sensor for detecting a displacement of a target, which is a movable member mounted in a device equipped with the displacement sensor or an object carried by the device, the displacement sensor comprising:
an emission unit configured to emit laser light;
an illumination optical system configured to convert the laser light into first converging light, and irradiate with the first converging light a detection space through which the target moves;
an imaging optical system configured to convert light reflected from the target into second converging light, the imaging optical system having an optical axis along which a first image of the emission unit into which the illumination optical system focuses the laser light from the emission unit is displaced by a temperature change of the illumination optical system within a range of displacement that is limited to be located either anterior to a front principal point of the imaging optical system, or posterior to a rear principal point of the imaging optical system, by factors that include (a) distance between the emission unit and the front principal point of the illumination optical system, (b) a rear focal point distance of the illumination optical system, (c) amounts of respective changes of the distance and the rear focal point distance caused by a temperature change of the illumination optical system, and (d) location of the front principal point of the imaging optical system relative to the illumination optical system;
a detection unit having a light-receiving surface to be irradiated by the second converging light, the detection unit configured to detect a distribution of amounts of the second converging light on the light-receiving surface; and
a calculation unit configured to make the emission unit repeatedly emit the laser light and make the detection unit repeatedly detect the distribution of amounts of the second converging light while the target crosses the detection space, and based on a shift of speckle pattern indicated by a difference between the distributions of amounts of the second converging light detected at different times, calculate a displacement of the target, wherein:
the rate of change $\Delta f/f$ of the rear focal point distance f of the illumination optical system due to a change $\Delta T$ in the temperature T of the illumination optical system is evaluated by the following equations, $$-\frac{\Delta f}{f} = \left(\omega \frac{d\lambda}{dT} + \psi\right)\Delta T, \omega = \frac{1}{n-1}\frac{\partial n}{\partial \lambda}, \text{ and } \psi = \frac{1}{n-1}\frac{\partial n}{\partial T} - \alpha,$$

in which the letters n, $\omega$, and $\psi$ denote the refractive index, dispersive power, and thermal dispersive power of the illumination optical system, respectively, the letter $\alpha$ denotes the linear expansion coefficient of glass material for the illumination optical system, and the letters $d\lambda/dT$ denote the dependence of the wavelength $\lambda$ of laser light ejected from the emission unit on the temperature of the emission unit; and
the rate of change $\Delta a/a$ of the distance a between the emission unit and the front principal point of the illumination optical system due to the change $\Delta T$ of the temperature T of the illumination optical system is evaluated by the product of the linear expansion coefficient $\beta$ of a member and the change $\Delta T$ in the temperature of the illumination optical system, the member maintaining the gap between the emission unit and the illumination optical system at a fixed distance.

5. The displacement sensor according to claim 4 further comprising:
a measurement unit configured to measure temperatures of the emission unit and the illumination optical system; and
a correction unit configured to calculate from values measured by the measurement unit an error of a shift ratio between speckle pattern caused by a displacement of the first image of the emission unit and the target, and based on the error, correct a displacement of the target calculated by the calculation unit.

6. A displacement sensor for detecting a displacement of a target, which is a movable member mounted in a device equipped with the displacement sensor or an object carried by the device, the displacement sensor comprising:
an emission unit configured to emit laser light;
an illumination optical system configured to convert the laser light into first converging light, and irradiate with the first converging light a detection space through which the target moves;
an imaging optical system configured to convert light reflected from the target into second converging light, the imaging optical system having an optical axis along which a first image of the emission unit into which the illumination optical system focuses the laser light from the emission unit is displaced by a temperature change of the illumination optical system within a range of displacement that is limited to be located either anterior to a front principal point of the imaging optical system, or posterior to a rear principal point of the imaging optical system, by factors that include (a) distance between the emission unit and the front principal point of the illumination optical system, (b) a rear focal point distance of the illumination optical system, (c) amounts of respective changes of the distance and the rear focal point distance caused by a temperature change of the illumination optical system, and (d) location of the front principal point of the imaging optical system relative to the illumination optical system;
a detection unit having a light-receiving surface to be irradiated by the second converging light, the detection unit configured to detect a distribution of amounts of the second converging light on the light-receiving surface; and
a calculation unit configured to make the emission unit repeatedly emit the laser light and make the detection unit repeatedly detect the distribution of amounts of the second converging light while the target crosses the detection space, and based on a shift of speckle pattern indicated by a difference between the distributions of amounts of the second converging light detected at different times, calculate a displacement of the target, wherein:
the calculation unit evaluates the ratio of a velocity V of speckle pattern with respect to a velocity v of the target by the following equation:

$$\frac{V}{v} = M\left(\frac{D}{Db} - 1\right),$$

in which the letters M, D, and Db denote (a) the magnification of the imaging optical system, (b) the distance between the light-receiving surface of the detection unit and the imaging surface of the imaging optical system, and (c) the distance between a second image of the emission unit into which the imaging optical system focuses the light reflected from the target and the imaging surface of the imaging optical system, respectively;

the distance between the first image of the emission unit and the front or rear principal point of the imaging optical system is shorter than the distance where an error of the velocity ratio V/v between speckle pattern caused by a displacement of the first image of the emission unit along the optical axis of the imaging optical system and the target reaches a boundary of an acceptable range; and the distance where the error of the velocity ratio V/v between speckle pattern caused by the displacement of the first image of the emission unit along the optical axis of the imaging optical system and the target reaches the boundary of the acceptable range is no more than half of the front or rear focal point distance of the imaging optical system.

7. The displacement sensor according to claim 6 wherein the magnification of the imaging optical system is no less than one.

8. The displacement sensor according to claim 6 further comprising:
   a measurement unit configured to measure temperatures of the emission unit and the illumination optical system; and
   a correction unit configured to calculate from values measured by the measurement unit an error of a shift ratio between speckle pattern caused by a displacement of the first image of the emission unit and the target, and based on the error, correct a displacement of the target calculated by the calculation unit.

* * * * *